US012767869B2

(12) United States Patent
Arthur et al.

(10) Patent No.: US 12,767,869 B2
(45) Date of Patent: Oct. 20, 2026

(54) SERRATED SHAPED ABRASIVE PARTICLES AND METHOD FOR MANUFACTURING THEREOF

(71) Applicant: 3M INNOVATIVE PROPERTIES COMPANY, St. Paul, MN (US)

(72) Inventors: Cory M. Arthur, Eagan, MN (US); Fay T. Salmon, Eden Prairie, MN (US); David T. Buckley, Falcon Heights, MN (US); Thomas J. Nelson, Woodbury, MN (US); Joseph B. Eckel, Vadnais Heights, MN (US); Emily L. Bowen, St. Paul, MN (US); Dwight D. Erickson, Woodbury, MN (US); Wayne W. Maurer, Lakeville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1085 days.

(21) Appl. No.: 17/309,784

(22) PCT Filed: Dec. 16, 2019

(86) PCT No.: PCT/IB2019/060861

§ 371 (c)(1),
(2) Date: Jun. 18, 2021

(87) PCT Pub. No.: WO2020/128794

PCT Pub. Date: Jun. 25, 2020

(65) Prior Publication Data

US 2022/0064508 A1 Mar. 3, 2022

Related U.S. Application Data

(60) Provisional application No. 62/781,652, filed on Dec. 19, 2018.

(51) Int. Cl.
*B24D 18/00* (2006.01)
*B24D 3/00* (2006.01)
(Continued)

(52) U.S. Cl.
CPC .............. *C09K 3/1409* (2013.01); *B24D 3/00* (2013.01); *B24D 18/0009* (2013.01); *B24D 18/0072* (2013.01); *B24D 11/001* (2013.01)

(58) Field of Classification Search
CPC .......... C09K 3/1409; C09K 3/14; B24D 3/00; B24D 18/0009; B24D 18/0072; B24D 11/001; B24D 18/00
See application file for complete search history.

(56) References Cited

U.S. PATENT DOCUMENTS 8,142,531 B2 3/2012 Adefris
8,728,185 B2 5/2014 Adefris
(Continued)

FOREIGN PATENT DOCUMENTS

DE 102013212690 A1 * 12/2014 .......... C09K 3/1409
EP 2370232 10/2011
(Continued)

OTHER PUBLICATIONS

DE-102013212690-A1, machine translation (Year: 2014).*
International Search Report for PCT International Application No. PCT/IB2019/060861, mailed on Apr. 2, 2020, 4 pages.

*Primary Examiner* — Marites A Guino-O Uzzle
(74) *Attorney, Agent, or Firm* — Martha J. Engel

(57) ABSTRACT

The present disclosure provides a shaped abrasive particle. The shaped abrasive particle includes a plurality of polygonal faces bound by respective polygonal perimeters and joined by at least one edge or sidewall to form the shaped abrasive particle. The shaped abrasive particle further
(Continued)

includes a serration configured to generate a fracture along a fracture plane extending at least through the serration.

15 Claims, 9 Drawing Sheets

(51) Int. Cl.
*C09K 3/14* (2006.01)
*B24D 11/00* (2006.01)

(56) References Cited

U.S. PATENT DOCUMENTS

| | | | | |
|---|---|---|---|---|
| 2010/0146867 | A1* | 6/2010 | Boden | B24D 18/0009 249/117 |
| 2013/0040537 | A1* | 2/2013 | Schwabel | B24D 18/0009 451/28 |
| 2015/0089881 | A1 | 4/2015 | Stevenson | |
| 2018/0215976 | A1* | 8/2018 | Cotter | C04B 35/58 |

FOREIGN PATENT DOCUMENTS

| | | |
|---|---|---|
| EP | 2635406 | 9/2013 |
| EP | 2692819 | 2/2014 |
| EP | 2692821 | 2/2014 |
| EP | 3134227 | 3/2017 |
| WO | WO 2014-020068 | 2/2014 |

* cited by examiner

SERRATED SHAPED ABRASIVE PARTICLES AND METHOD FOR MANUFACTURING THEREOF

CROSS REFERENCE TO RELATED APPLICATIONS

This application is a national stage filing under 35 U.S.C. 371 of PCT/IB2019/060861, filed Dec. 16, 2019, which claims the benefit of U.S. Provisional Application No. 62/781,652, filed Dec. 19, 2018, the disclosure of which is incorporated by reference in its/their entirety herein.

BACKGROUND

Abrasive particles and abrasive articles including the abrasive particles are useful for abrading, finishing, or grinding a wide variety of materials and surfaces in the manufacturing of goods. As such, there continues to be a need for improving the cost, performance, or life of abrasive particles or abrasive articles.

SUMMARY OF THE DISCLOSURE

The present disclosure provides a shaped abrasive particle. The shaped abrasive particle includes a plurality of polygonal faces bound by respective polygonal perimeters and joined by at least one edge or sidewall to form the shaped abrasive particle. The shaped abrasive particle further includes a serration configured to generate a fracture along a fracture plane extending at least through the serration.

The present disclosure further provides a method of making a shaped abrasive particle. The shaped abrasive particle includes a plurality of polygonal faces bound by respective polygonal perimeters and joined by at least one edge or sidewall to form the shaped abrasive particle. The shaped abrasive particle further includes a serration configured to generate a fracture along a fracture plane extending at least through the serration. The method includes disposing an abrasive particle precursor composition in a mold cavity conforming to the negative image of the shaped abrasive particle. The method further includes drying the abrasive particle precursor to form the shaped abrasive particle.

The present disclosure further provides another method of making a shaped abrasive particle. The shaped abrasive particle includes a plurality of polygonal faces bound by respective polygonal perimeters and joined by at least one edge or sidewall to form the shaped abrasive particle. The shaped abrasive particle further includes a serration configured to generate a fracture along a fracture plane extending at least through the serration. The method includes etching the serration in the external surface of the shaped abrasive particle.

The present disclosure further provides another method of making a shaped abrasive particle. The shaped abrasive particle includes a plurality of polygonal faces bound by respective polygonal perimeters and joined by at least one edge or sidewall to form the shaped abrasive particle. The shaped abrasive particle further includes a serration configured to generate a fracture along a fracture plane extending at least through the serration. The method includes additively manufacturing the shaped abrasive particle.

The present disclosure further provides a coated abrasive article. The coated abrasive article includes a backing and a plurality of shaped abrasive particles attached to the backing. An individual shaped abrasive particle includes a plurality of polygonal faces bound by respective polygonal perimeters and joined by at least one edge or sidewall to form the shaped abrasive particle. The shaped abrasive particle further includes a serration configured to generate a fracture along a fracture plane extending at least through the serration.

The present disclosure further provides a bonded abrasive article. The bonded abrasive article includes a binder. The bonded abrasive article further includes a plurality of shaped abrasive particles disposed in the binder. An individual shaped abrasive particle includes a plurality of polygonal faces bound by respective polygonal perimeters and joined by at least one edge or sidewall to form the shaped abrasive particle. The shaped abrasive particle further includes a serration configured to generate a fracture along a fracture plane extending at least through the serration.

The present disclosure further provides a method of making an abrasive article. The method includes adhering a shaped abrasive particle to a backing or depositing the shaped abrasive particles in a binder. The shaped abrasive particle includes a plurality of polygonal faces bound by respective polygonal perimeters and joined by at least one edge or sidewall to form the shaped abrasive particle. The shaped abrasive particle further includes a serration configured to generate a fracture along a fracture plane extending at least through the serration.

The present disclosure further provides a method of using an abrasive article. The method includes contacting shaped abrasive particles with a workpiece. The abrasive particle includes a plurality of polygonal faces bound by respective polygonal perimeters and joined by at least one edge or sidewall to form the shaped abrasive particle. The shaped abrasive particle further includes a serration configured to generate a fracture along a fracture plane extending at least through the serration. The method further includes moving at least one of the abrasive article and the workpiece relative to each other in the direction of use. The method further includes removing a portion of the workpiece.

There are various benefits associated with the present disclosure, some of which are unexpected. For example, according to some embodiments of the present disclosure, including one or more serrations in the shaped abrasive particles can help to initiate fracturing at a desired location and in a desired direction. According to some embodiments, this can help to control the rate, location, or both of fracturing in a shaped abrasive particle and allow for small portions of the shaped abrasive particle to fracture, thus allowing the shaped abrasive particles to retain their abrasive properties, as opposed to having uncontrolled large portions of the shaped abrasive particles fracture, thus rendering the shaped abrasive particles less effective. According to some embodiments, the serrations can be oriented to be aligned with a direction of use of an abrasive article such that a portion or portions of the abrasive article that include the serrations are brought in contact with a workpiece. According to some embodiments, providing serrations imparts a level of control of fracturing that is superior to conventional methods where fracture control is tied to material and even the crystalline structure of the abrasive particle exclusively. According to some embodiments, shaped abrasive particles that are free of the serrations described herein may not fracture and therefore the tips of those particles will not sharpen during use, but instead will continuously dull, thus reducing the abrasive performance, increase the amount of heat generated during use, and the degree of capping on the tip. According to some embodiments, including one or more serrations can be helpful to retain and anchor shaped abrasive particles into a make coat or other adhesive layer of an abrasive article.

BRIEF DESCRIPTION OF THE FIGURES

The drawings illustrate generally, by way of example, but not by way of limitation, various embodiments discussed in the present document.

DETAILED DESCRIPTION

Figure 1A:
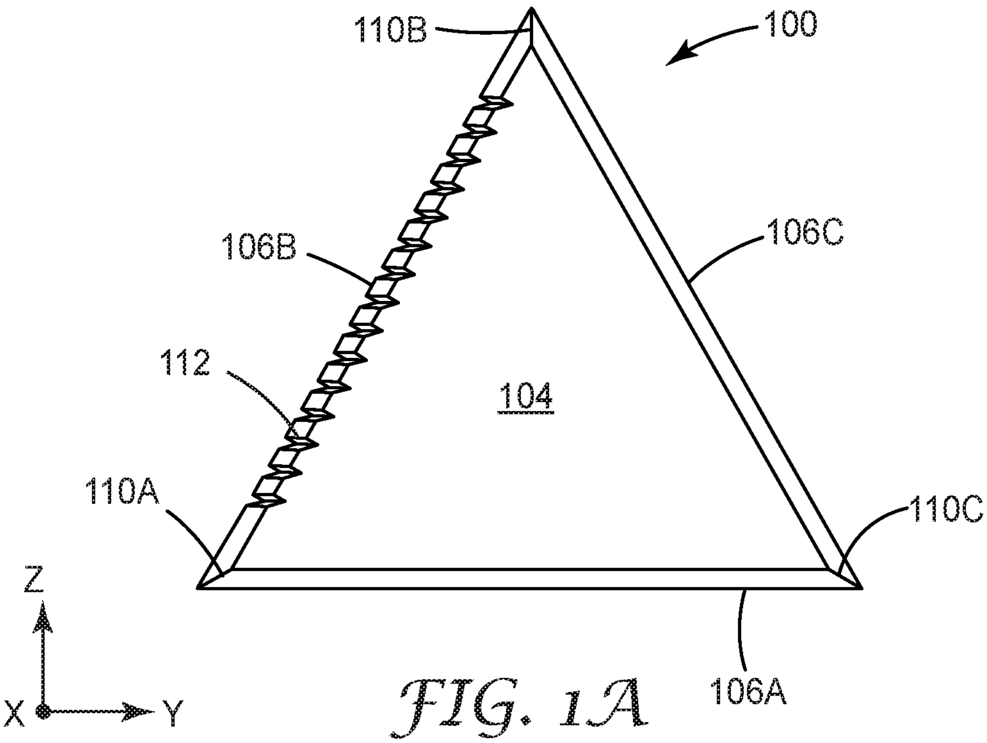
FIGS. 1A-1E are schematic diagrams of serrated shaped abrasive particles having a planar trigonal shape, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

As used herein, "shaped abrasive particle" means an abrasive particle having a predetermined or non-random shape. One process to make a shaped abrasive particle such as a shaped ceramic abrasive particle includes shaping the precursor ceramic abrasive particle in a mold having a predetermined shape to make ceramic-shaped abrasive particles. Ceramic-shaped abrasive particles, formed in a mold, are one species in the genus of shaped ceramic abrasive particles. Other processes to make other species of shaped ceramic abrasive particles include extruding the precursor ceramic abrasive particle through an orifice having a predetermined shape, printing the precursor ceramic abrasive particle though an opening in a printing screen having a predetermined shape, or embossing the precursor ceramic abrasive particle into a predetermined shape or pattern. In other examples, the shaped ceramic abrasive particles can be cut from a sheet into individual particles. Examples of suitable cutting methods include mechanical cutting, laser cutting, or water-jet cutting. Non-limiting examples of shaped ceramic abrasive particles include shaped abrasive particles, such as triangular plates, or elongated ceramic rods/filaments. Shaped ceramic abrasive particles are generally homogenous or substantially uniform and maintain their sintered shape without the use of a binder such as an organic or inorganic binder that bonds smaller abrasive particles into an agglomerated structure and excludes abrasive particles obtained by a crushing or comminution process that produces abrasive particles of random size and shape. In many embodiments, the shaped ceramic abrasive particles comprise a homogeneous structure of sintered alpha alumina or consist essentially of sintered alpha alumina.

As used herein "serration" refers to a notch extending at least along a depth of a shaped abrasive particle or to a protrusion extending at least away from the shaped abrasive particle.

Figure 1B:
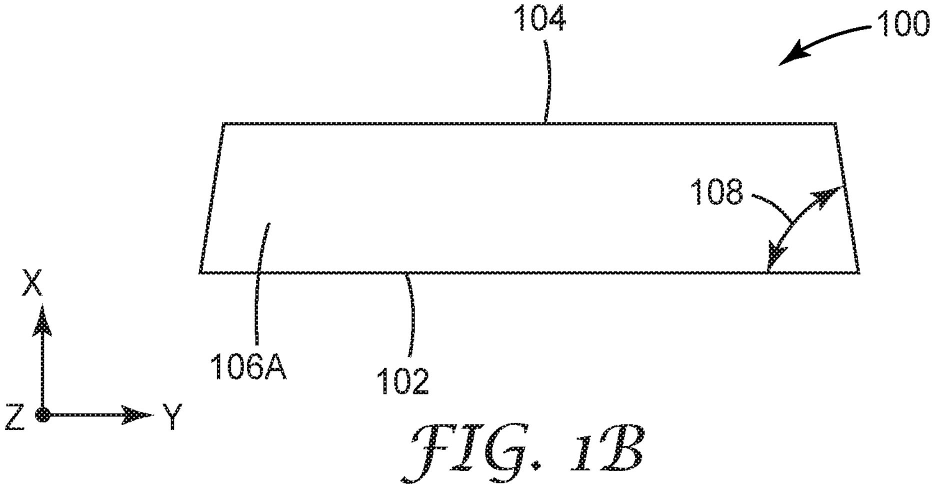

FIGS. 1A, 1B, 1C, 1D, and 1E show an example of shaped abrasive particle 100 as an equilateral triangle conforming to a truncated pyramid. As shown in FIGS. 1A and 1B, shaped abrasive particle 100 includes a truncated regular triangular pyramid bounded by a triangular base 102, a triangular top 104, and a plurality of sloping sides 106A, 106B, 106C connecting triangular base 102 (shown as equilateral, although scalene, obtuse, isosceles, and right triangles are possible) and triangular top 104. Slope angle 108 is the dihedral angle formed by the intersection of side 106A with triangular base 102. Similarly, slope angles 108B and 108C (both not shown) correspond to the dihedral angles formed by the respective intersections of sides 106B and 106C with triangular base 102. In the case of shaped abrasive particle 100, all of the slope angles have equal value. In some embodiments, side edges 110A, 110B, and 110C have an average radius of curvature in a range of from about 0.5 μm to about 80 μm, about 10 μm to about 60 μm, or less than, equal to, or greater than about 0.5 μm, 5, 10, 15, 20, 25, 30, 35, 40, 45, 50, 55, 60, 65, 70, 75, or about 80 μm.

In the embodiment shown in FIGS. 1A, 1B, 1C, 1D, and 1E, sides 106A, 106B, and 106C have equal dimensions and form dihedral angles with the triangular base 102 of about 82 degrees (corresponding to a slope angle of 82 degrees). However, it will be recognized that other dihedral angles (including 90 degrees) may also be used. For example, the dihedral angle between the base and each of the sides may independently range from about 45 to about 90 degrees (for example, from about 70 to about 90 degrees, or from about 75 to about 85 degrees). Edges connecting sides 106, base 102, and top 104 can have any suitable length. For example, a length of the edges may be in a range of from about 0.5 μm to about 5000 μm, about 150 μm to about 200 μm, or less than, equal to, or greater than about 0.5 μm, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, or about 5000 μm.

Figure 2A:
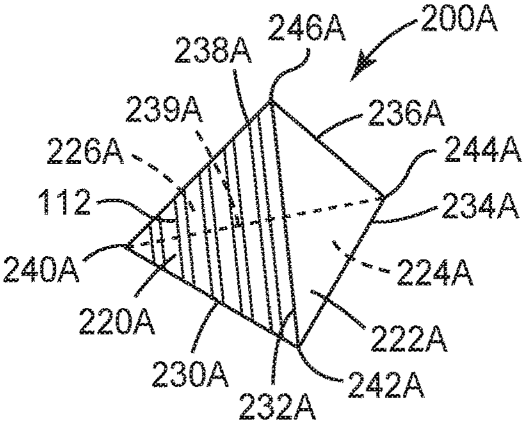
FIGS. 2A-2H are schematic diagrams of shaped abrasive particles having a tetrahedral shape, in accordance with various embodiments.

Another example of a shaped abrasive particle is shown in FIGS. 2A-2H. As shown in FIGS. 2A-2G, shaped abrasive particles 200 are shaped as regular tetrahedrons. As shown in FIG. 2A, shaped abrasive particle 200A has four faces (220A, 222A, 224A, and 226A) joined by six edges (230A, 232A, 234A, 236A, 238A, and 239A) terminating at four vertices (240A, 242A, 244A, and 246A). Each of the four faces contacts the other three of the faces at the edges. While a regular tetrahedron (e.g., having six equal edges and four faces) is depicted in FIG. 2A, it will be recognized that other shapes are also permissible. For example, tetrahedral abrasive particles 200 can be shaped as irregular tetrahedrons (e.g., having edges of differing lengths).

Figure 2B:
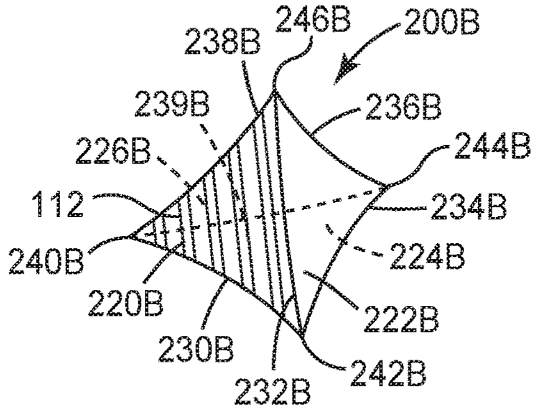

Referring now to FIG. 2B, shaped abrasive particle 200B has four faces (220B, 222B, 224B, and 226B) joined by six edges (230B, 232B, 234B, 238B, and 239B) terminating at four vertices (240B, 242B, 244B, and 246B). Each of the four faces is concave and contacts the other three of the faces at respective common edges. While a particle with tetrahedral symmetry (e.g., four rotational axes of threefold symmetry and six reflective planes of symmetry) is depicted in FIG. 2B, it will be recognized that other shapes are also permissible. For example, shaped abrasive particles 200B can have one, two, or three concave faces with the remainder being planar.

Figure 2C:
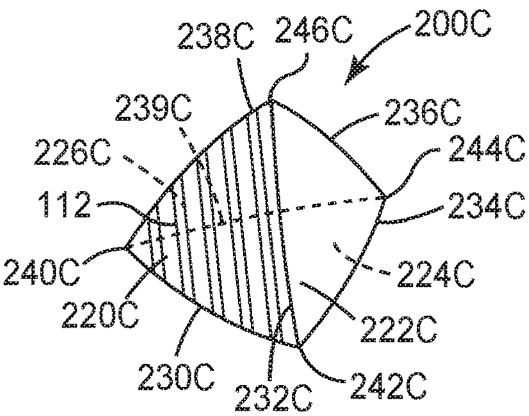

Referring now to FIG. 2C, shaped abrasive particle 200C has four faces (220C, 222C, 224C, and 226C) joined by six edges (230C, 232C, 234C, 236C, 238C, and 239C) terminating at four vertices (240C, 242C, 244C, and 246C). Each of the four faces is convex and contacts the other three of the faces at respective common edges. While a particle with tetrahedral symmetry is depicted in FIG. 2C, it will be recognized that other shapes are also permissible. For example, shaped abrasive particles 200C can have one, two, or three convex faces with the remainder being planar or concave.

Figure 2D:
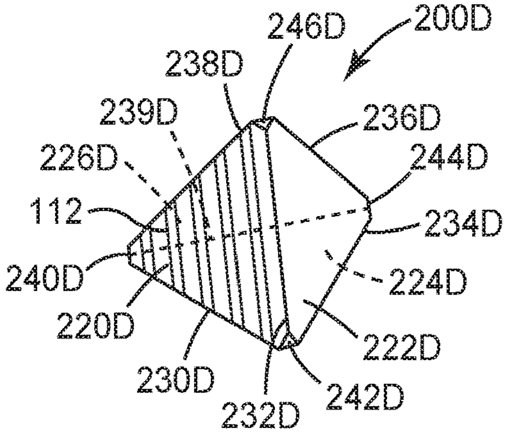

Referring now to FIG. 2D, shaped abrasive particle 200D has four faces (220D, 222D, 224D, and 226D) joined by six edges (230D, 232D, 234D, 236D, 238D, and 239D) terminating at four vertices (240D, 242D, 244D, and 246D). While a particle with tetrahedral symmetry is depicted in FIG. 2D, it will be recognized that other shapes are also permissible. For example, shaped abrasive particles 200D can have one, two, or three convex faces with the remainder being planar.

Figure 2E:
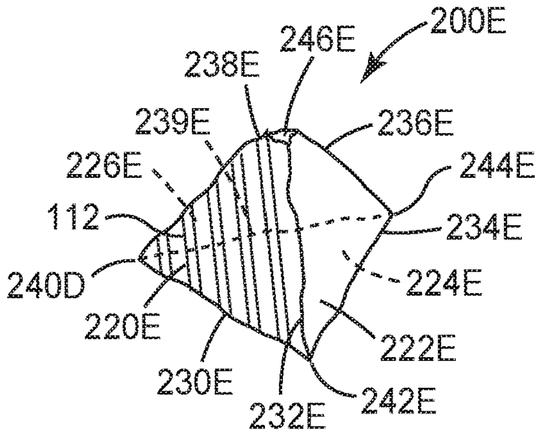

Deviations from the depictions in FIGS. 2A-2D can be present. An example of such a shaped abrasive particle 200 is depicted in FIG. 2E, showing shaped abrasive particle 200E, which has four faces (220E, 222E, 224E, and 226E) joined by six edges (230E, 232E, 234E, 238E, and 239E) terminating at four vertices (240E, 242E, 244E, and 246E). Each of the four faces contacts the other three of the faces at respective common edges. Each of the faces, edges, and vertices has an irregular shape.

Figure 2F:
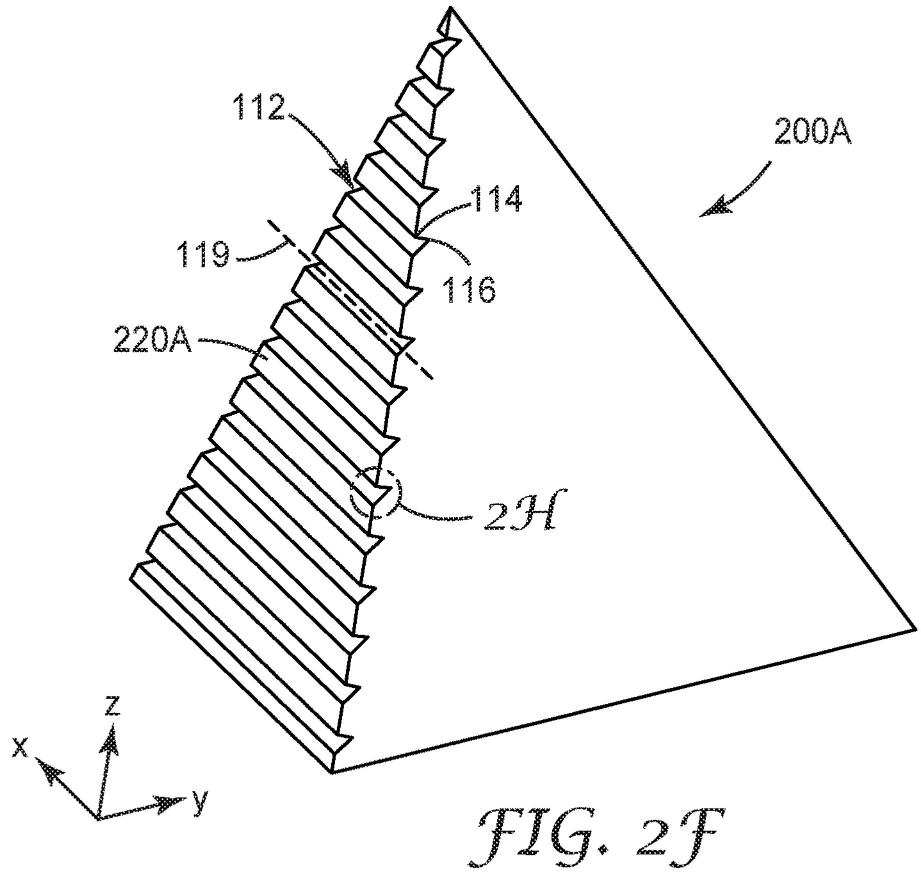
Figure 2G:
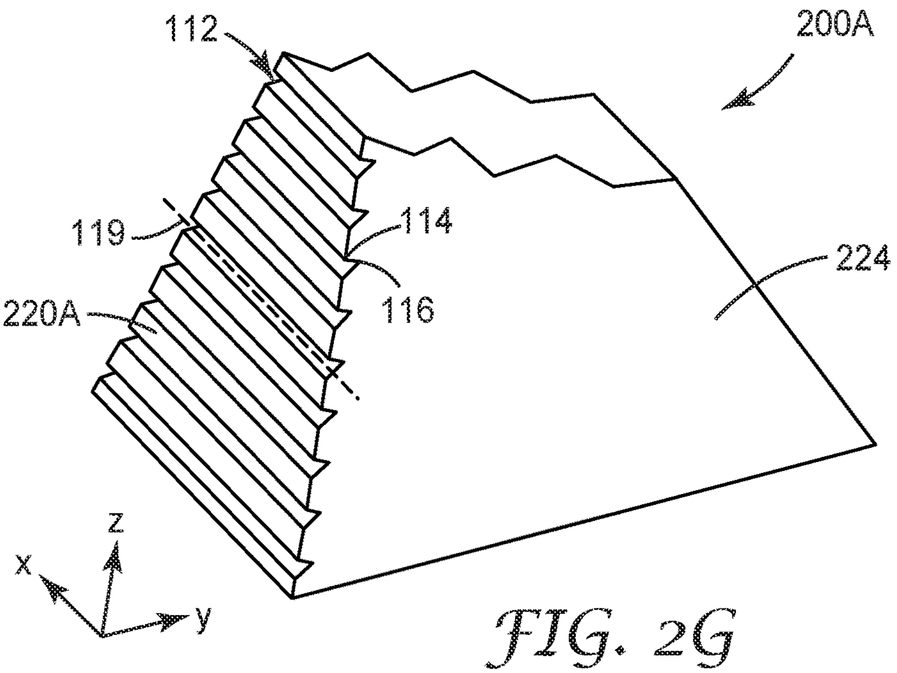
Figure 2H:
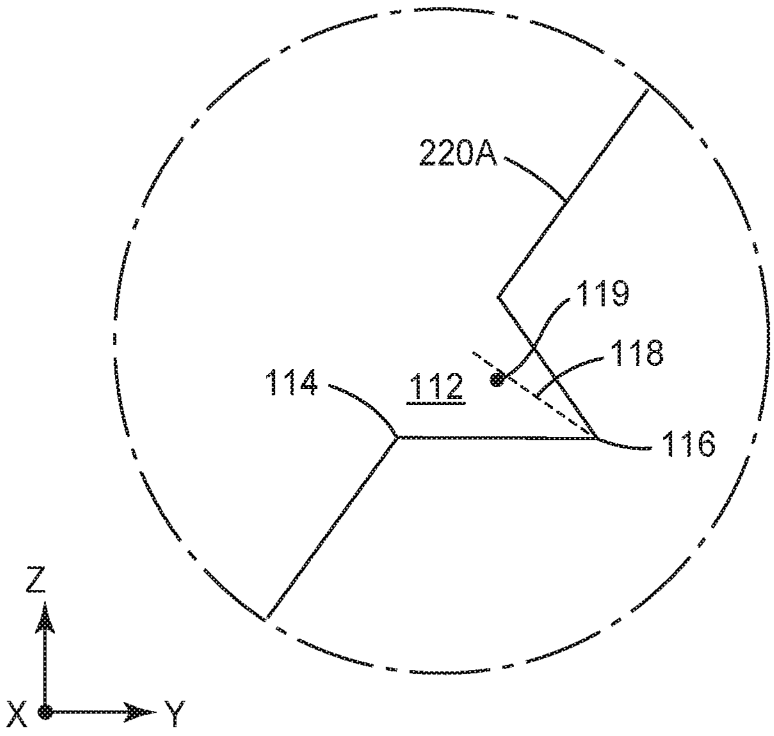

FIGS. 2F and 2G are further perspective views of shaped abrasive particle 200A. FIG. 2F is zoomed relative to FIG. 2A. FIG. 2G shows shaped abrasive particle 200A after a portion of shaped abrasive particle 200A is fragmented. FIG. 2H shows a zoomed view of the highlighted region of FIG. 2F.

In any of shaped abrasive particles 200A-200E, the edges can have the same length or different lengths. The length of any of the edges can be any suitable length. As an example, the length of the edges can be in a range of from about 0.5 μm to about 2000 μm, about 150 μm to about 200 μm, or less than, equal to, or greater than about 0.5 μm, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or about 2000 μm. Shaped abrasive particles 200A-200E can be the same size or different sizes.

Figure 1C:
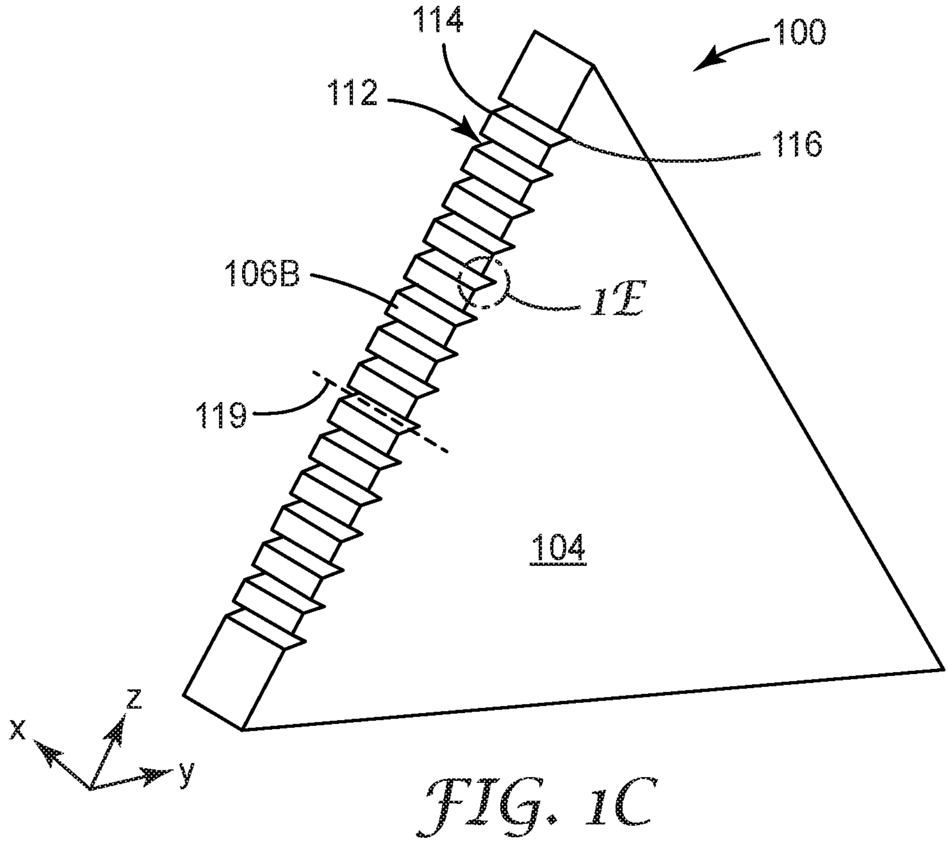
Figure 1D:
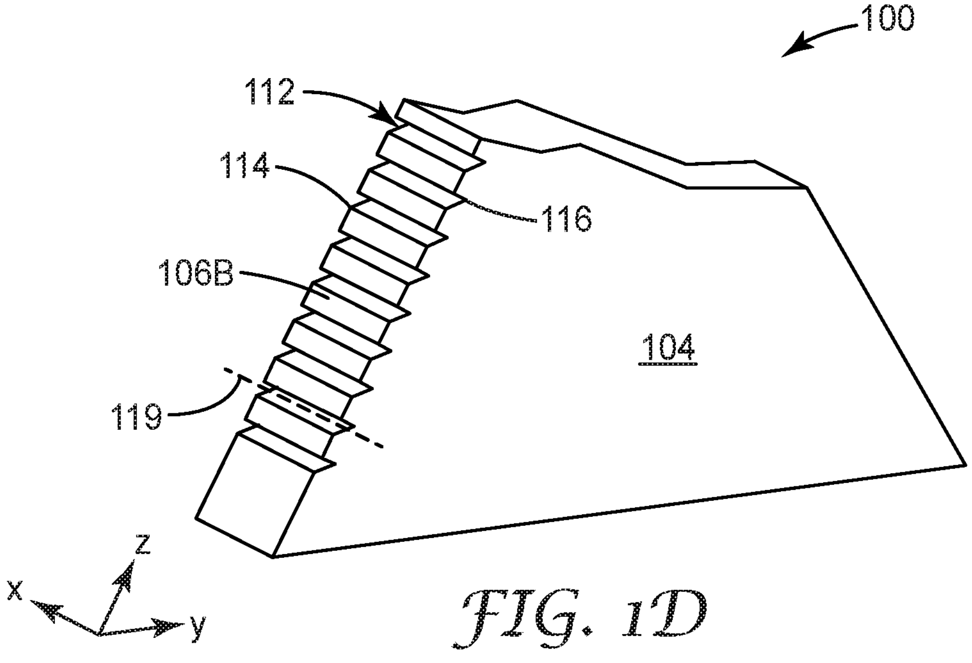
Figure 1E:
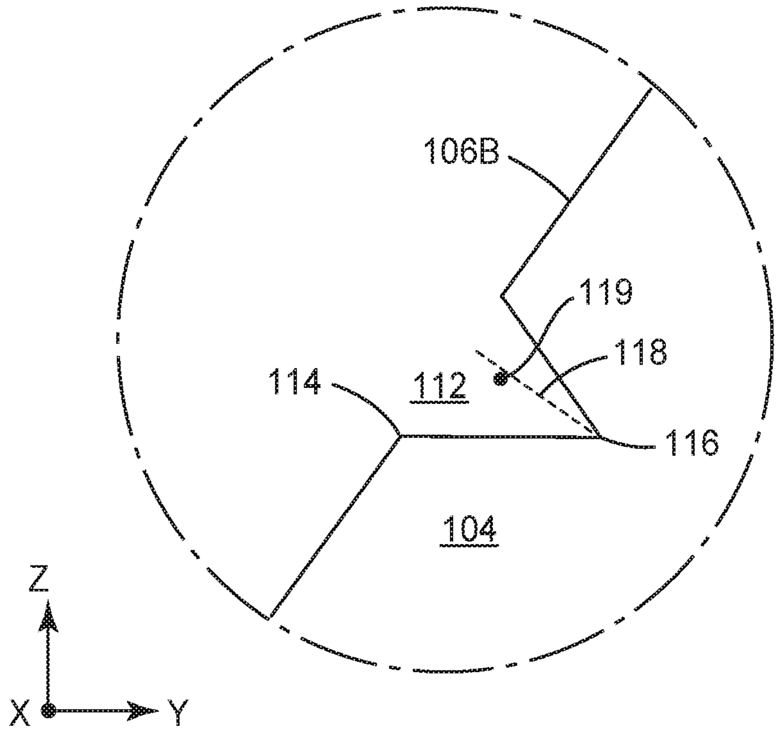

FIGS. 1A-1E and 2A-2H additionally show shaped abrasive particles 100 and 200 as including serrations 112. Individual serrations 112 extend from open end 114 to closed end 116. Open end 114 is defined by an external surface of at least one face (e.g., triangular base 102 or triangular top 104 of shaped abrasive particle 100 or faces 220, 222, 224, or 226 of shaped abrasive particle 200), at least one edge (e.g., side edges 110A, 110B, or 110C of shaped abrasive particle 100 or edges 230, 232, 234, 236, 238, or 239 of shaped abrasive particle 200), at least one sidewall (e.g., sides 106A, 106B, or 106C of shaped abrasive particle 100), or a combination thereof. As shown in FIGS. 1C-1E, serrations 112 are located on side 106B. As shown in FIGS. 2F-2H, serrations 112 are located on face 220A. A distance between open end 114 and closed end 116 can be measured as a percentage of the total depth of shaped abrasive particle 100 or 200. If serration 112 is located on any portion of side edge 110A. A depth of shaped abrasive particle 100 or 200 can be locally measured along the x-, y-, or z-axis between opposed locations on an external surface of shaped abrasive particle 100 or 200. The distance between open end 114 and closed end 116 of an individual serration 112 can be tuned to be any suitable value. For example, the distance can be in a range of from about 0.5 percent depth of abrasive particle 100 or 200 to about 20 percent depth of shaped abrasive particle 100 or 200, or about 2 percent depth of the abrasive particle to about 10 percent depth, less than, equal to, or greater than about 0.5 percent depth, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 percent depth.

Open end 114 can account for any percent of the total surface area of at least one face (e.g., triangular base 102 or triangular top 104 of shaped abrasive particle 100 or faces 220, 222, 224, or 226 of shaped abrasive particle 200), at least one edge (e.g., side edges 110A, 110B, or 110C of shaped abrasive particle 100 or edges 230, 232, 234, 236, 238, or 239 of shaped abrasive particle 200), at least one sidewall (e.g., sides 106A, 106B, or 106C of shaped abrasive particle 100), or a combination thereof. For example, open end 114 may extend over a range of from about 0.0025 percent surface area to about 10 percent surface area of the at least one face, edge, or sidewall to a closed end, about 0.1 percent surface area to about 5 percent surface area, less than, equal to, or greater than about 0.0025 percent surface area, 0.0050, 0.0100, 0.0200, 0.0300, 0.0400, 0.0500, 0.0600, 0.0700, 0.0800, 0.0900, 0.1000, 0.5000, 1, 1.5, 2, 2.5, 3, 3.5, 4, 4.5, 5, 5.5, 6, 6.5, 7, 7.5, 8, 8.5, 9, 9.5, or about 10 percent surface area. As shown in FIGS. 1A-1E, each serration 112 extends fully across a minor width of side 106B, but in alternative embodiments, it may be possible for serration 112 to extend over only a portion of the minor width of side 106B. In embodiments in which serration 112 is located on any of triangular base 102, triangular top 104, or any of edges 110, serration 112 can extend across the entire width of that feature or across only a portion of that width. Similarly, as shown in FIGS. 2A, 2F-2H, each serration 112 extends fully across the width of face 220A, but in alternative embodiments, serration 112 may extend only over a portion of the width of face 220A.

As shown in FIGS. 1C-1E, serration 112 extends from open end 114 to closed end 116 along line 118, which extends in a direction substantially perpendicular to sidewall 106B. In further embodiments, however, serration 112 can extend in a direction offset from line 118 in a range of from about 1 degree to about 60 degrees offset from line 118, about 5 degrees to about 30 degrees, less than, equal to, or greater than about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or about 60 degrees. Axis 119 of serration 112 is shown as perpendicular to face 104 but depending on the degree to which serration 112 is offset, axis 119 can be tilted or non-linear.

A cross-sectional geometry of serration 112 can correspond to any circular or polygonal shape. The cross-sectional geometry can be taken along the x-z plane or y-z plane. For example, with respect to the cross-sectional geometry of serrations 112 discussed with respect to FIGS. 1A, 1C, 1D, and 1E as well as FIGS. 2A-2H, the cross-sectional geometry of serration 112 is taken along the y-z plane. In embodiments in which the cross-sectional geometry of serration 112 corresponds to a circular shape, the circular shape can be symmetric or asymmetric (e.g., elliptical or ovular, conical, cylindrical, or frustoconical. In embodiments in which the cross-sectional geometry of serration 112 corresponds to a polygonal shape, the polygonal shape can include a symmetric or asymmetric triangular shape, a quadrilateral shape, a pentagonal shape, or a hexagonal shape. Examples of triangular shapes include an equilateral triangle, a right triangle, a scalene triangle, an isosceles triangle, an acute triangle, or an obtuse triangle. Examples of symmetric or asymmetric quadrilateral shapes include a square, a rectangle, a rhombus, or a trapezoid.

Closed end 116 can terminate as a blunt end. However, closed end 116 can also be curved. In examples where closed end 116 is curved, a radius of curvature of closed end 116 can be in a range of about 0.1 microns to about 50 microns, about 0.5 microns to about 20 microns, less than, equal to, or greater that about 0.5 microns, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50 microns.

As shown, in FIGS. 1A-1D and 2A-2G, shaped abrasive particles 100 and 200 include a plurality of serrations 112 with adjacent serrations 112 being spaced at constant intervals with respect to each other. In further embodiments, it is possible for serrations 112 to be spaced variably across shaped abrasive particle 100. Although shaped abrasive particles 100 or 200 with a plurality of serrations 112 are shown, it is possible for shaped abrasive particles 100 or 200 to have only a single serration 112.

In embodiments of shaped abrasive particles 100 that include a plurality of serrations 112, serrations can be located in one or more regions of shaped abrasive particle 100. For example, as shown, serrations 112 are located in a first region defined by side 106B. The first region can be in a range of from about 5 percent to about 100 percent of the total surface area of shaped abrasive particle 100, about 25 percent to about 33 percent, less than, equal to, or greater than about 5 percent, 10, 15, 20, 25, 30, 35, 40, 45, 50, 55, 60, 65, 70, 75, 80, 85, 90, 95, or about 100 percent. In some embodiments, shaped abrasive particle 100 can include at least two pluralities of serrations 112, disposed in respective first and second regions of shaped abrasive particle 100. The second region can be in a range of from about 5 percent to about 95 percent of the total surface area of shaped abrasive particle 100, about 25 percent to about 33 percent, less than, equal to, or greater than about 5 percent, 10, 15, 20, 25, 30, 35, 40, 45, 50, 55, 60, 65, 70, 75, 80, 85, 90, or about 95. The respective first and second pluralities of serrations 112 can account for any percentage of the total number of serrations 112. For example the first and second pluralities of serrations 112 can independently be in a range of from about 5 percent to about 95 percent of the total number of serrations 112, about 20 percent to about 60 percent, about 5 percent to about 100 percent, less than, equal to, or greater than about 5 percent, 10, 15, 20, 25, 30, 35, 40, 45, 50, 55, 60, 65, 70, 75, 80, 85, 90, or 95 percent.

Serrations 112 are helpful to initiate fracturing in desired locations on shaped abrasive particles 100 or 200. Therefore, serrations 112 can be purposefully placed in select regions to control the locations at which shaped abrasive particle 100 or 200 fragments. The degree to which individual serrations 112 are offset or aligned with line 118 can control the direction of fracture propagation substantially along a fracture plane. This can help to control the shape of particle 100 or 200 throughout use as portions are fractured. Therefore the tip can remain sharp over the course of repeated grinding operations. By placing serration 112 in precise locations, the fracture propagation substantially along a fracture plane in shaped abrasive particle 100 or 200 during use can be controlled so that selected portions of shaped abrasive particle 100 or 200 are removed in order. To show the effect of serrations 112 in shaped abrasive particle 100, FIG. 1D is provided. FIG. 1D shows shaped abrasive particle 100 after a fragment of shaped abrasive particle 100 is removed after the top portion is fractured under forces exerted by cutting during a grinding operation. This can be seen by comparing FIG. 1D to FIG. 1C. Although a portion of the triangular top 104 of shaped abrasive particle 100, as shown in FIG. 1D, is removed, shaped abrasive particle 100 still maintains a sharp point or sharp edges and functions an effective abrasive particle.

Similarly, FIG. 2G shows shaped abrasive particle 200A after a fragment of shaped abrasive particle 200A is removed after the top portion is fractured under forces exerted by cutting during a grinding operation. This can be seen by comparing FIG. 2F to FIG. 2G. Although a portion of the tip of shaped abrasive particle 200A, as shown in FIG. 2G is removed, shaped abrasive particle 200A still maintains a sharp point or sharp edges to function as an effective abrasive particle. The description of fracture propagation with respect to shaped abrasive particle 200A is equally applicable to shaped abrasive particles 200B-200E.

Including serrations 112 can allow shaped abrasive particle 100 or 200 to maintain their abrasive properties longer than a corresponding shaped abrasive particle that is free of serrations 112. This is because fracture propagation of the corresponding shaped abrasive particle is not controlled to the same degree and larger fragments of the corresponding shaped abrasive particle can be removed. This can result in dulling the shaped abrasive particle comparatively quicker than shaped abrasive particle 100 or 200. Additionally, without serration 112, some shaped abrasive particles will be less likely to, or never fracture and in combination with increased dulling, they will lead to increased amounts of heat generated during use and an increased degree of capping on the tip of the particle.

Serrations 112 can also be purposefully placed in regions of shaped abrasive particle 100 or 200 that are most likely to be at least partially embedded in a make layer of a coated abrasive article or a binder of a bonded abrasive article. Serrations 112 locally increase surface area of shaped abrasive particle 100, and having serrations 112 at least partially embedded within the make layer or binder can help to secure shaped abrasive particle 100 therein.

Any of shaped abrasive particles 100 or 200 can include any number of shape features. The shape features can help to improve the cutting performance of any of shaped abrasive particles 100 or 200. Examples of suitable shape features include an opening, a concave surface, a convex surface, a fractured surface, a low roundness factor, or a perimeter comprising one or more corner points having a sharp tip. Individual shaped abrasive particles can include any one or more of these features.

Shaped abrasive particles 100 or 200 can include any suitable material or mixture of materials. For example, shaped abrasive particles 100 can include a material chosen from an alpha-alumina, a fused aluminum oxide, a heat-treated aluminum oxide, a ceramic aluminum oxide, a sintered aluminum oxide, a silicon carbide, a titanium diboride, a boron carbide, a tungsten carbide, a titanium carbide, a diamond, a cubic boron nitride, a garnet, a fused alumina-zirconia, a sol-gel derived abrasive particle, a cerium oxide, a zirconium oxide, a titanium oxide, and combinations thereof. In some embodiments, shaped abrasive particles 100 or 200 and crushed abrasive particles can include the same materials. In further embodiments, shaped abrasive particles 100 or 200 and crushed abrasive particles can include different materials.

Some shaped abrasive particles 100 or 200 can include a polymeric material and can be characterized as soft abrasive particles. The soft shaped abrasive particles described herein can independently include any suitable material or combination of materials. For example, the soft shaped abrasive particles can include a reaction product of a polymerizable mixture including one or more polymerizable resins. The one or more polymerizable resins such as a hydrocarbyl polymerizable resin. Examples of such resins include those chosen from a phenolic resin, a urea formaldehyde resin, a urethane resin, a melamine resin, an epoxy resin, a bismaleimide resin, a vinyl ether resin, an aminoplast resin (which may include pendant alpha, beta unsaturated carbonyl groups), an acrylate resin, an acrylated isocyanurate resin, an isocyanurate resin, an acrylated urethane resin, an acrylated epoxy resin, an alkyl resin, a polyester resin, a drying oil, or mixtures thereof. The polymerizable mixture can include additional components such as a plasticizer, an acid catalyst, a cross-linker, a surfactant, a mild-abrasive, a pigment, a catalyst and an antibacterial agent.

Where multiple components are present in the polymerizable mixture, those components can account for any suitable weight percentage of the mixture. For example, the polymerizable resin or resins, may be in a range of from about 35 wt % to about 99.9 wt % of the polymerizable mixture, about 40 wt % to about 95 wt %, or less than, equal to, or greater than about 35 wt %, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or about 99.9 wt %.

If present, the cross-linker may be in a range of from about 2 wt % to about 60 wt % of the polymerizable mixture, from about 5 wt % to about 10 wt %, or less than, equal to, or greater than about 2 wt %, 3, 4, 5, 6, 7, 8, 9, 10, 11, 12, 13, 14, or about 15 wt %. Examples of suitable cross-linkers include a cross-linker available under the trade designation CYMEL 303 LF, of Allnex USA Inc., Alpharetta, Georgia, USA; or a cross-linker available under the trade designation CYMEL 385, of Allnex USA Inc., Alpharetta, Georgia, USA.

If present, the mild-abrasive may be in a range of from about 5 wt % to about 65 wt % of the polymerizable mixture, about 10 wt % to about 20 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 wt %. Examples of suitable mild-abrasives include a mild-abrasive available under the trade designation MINSTRON 353 TALC, of Imerys Talc America, Inc., Three Forks, Montana, USA; a mild-abrasive available under the trade designation USG TERRA ALBA NO.1 CALCIUM SULFATE, of USG Corporation, Chicago, Illinois, USA; Recycled Glass (40-70 Grit) available from ESCA Industries, Ltd., Hatfield, Pennsylvania, USA, silica, calcite, nepheline, syenite, calcium carbonate, or mixtures thereof.

If present, the plasticizer may be in a range of from about 5 wt % to about 40 wt % of the polymerizable mixture, about 10 wt % to about 15 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 wt %. Examples of suitable plasticizers include acrylic resins or styrene butadiene resins. Examples of acrylic resins include an acrylic resin available under the trade designation RHOPLEX GL-618, of DOW Chemical Company, Midland, Michigan, USA; an acrylic resin available under the trade designation HYCAR 2679, of the Lubrizol Corporation, Wickliffe, Ohio, USA; an acrylic resin available under the trade designation HYCAR 26796, of the Lubrizol Corporation, Wickliffe, Ohio, USA; a polyether polyol available under the trade designation ARCOL LG-650, of DOW Chemical Company, Midland, Michigan, USA; or an acrylic resin available under the trade designation HYCAR 26315, of the Lubrizol Corporation, Wickliffe, Ohio, USA. An example of a styrene butadiene resin includes a resin available under the trade designation ROVENE 5900, of Mallard Creek Polymers, Inc., Charlotte, North Carolina, USA.

If present, the acid catalyst may be in a range of from 1 wt % to about 20 wt % of the polymerizable mixture, about 5 wt % to about 10 wt %, or less than, equal to, or greater than about 1 wt %, 2, 3, 4, 5, 6, 7, 8, 9, 10, 11, 12, 13, 14, 15, 16, 17, 18, 19, or about 20 wt %. Examples of suitable acid catalysts include a solution of aluminum chloride or a solution of ammonium chloride.

If present, the surfactant can be in a range of from about 0.001 wt % to about 15 wt % of the polymerizable mixture about 5 wt % to about 10 wt %, less than, equal to, or greater than about 0.001 wt %, 0.01, 0.5, 1, 2, 3, 4, 5, 6, 7, 8, 9, 10, 11, 12, 13, 14, or about 15 wt %. Examples of suitable surfactants include a surfactant available under the trade designation GEMTEX SC-85-P, of Innospec Performance Chemicals, Salisbury, North Carolina, USA; a surfactant available under the trade designation DYNOL 604, of Air Products and Chemicals, Inc., Allentown, Pennsylvania, USA; a surfactant available under the trade designation ACRYSOL RM-8W, of DOW Chemical Company, Midland, Michigan, USA; or a surfactant available under the trade designation XIAMETER AFE 1520, of DOW Chemical Company, Midland, Michigan, USA.

If present, the antimicrobial agent may be in a range of from 0.5 wt % to about 20 wt % of the polymerizable mixture, about 10 wt % to about 15 wt %, or less than, equal to, or greater than about 0.5 wt %, 1, 2, 3, 4, 5, 6, 7, 8, 9, 10, 11, 12, 13, 14, 15, 16, 17, 18, 19, or about 20 wt %. An example of a suitable antimicrobial agent includes zinc pyrithione.

If present, the pigment may be in a range of from about 0.1 wt % to about 10 wt % of the polymerizable mixture, about 3 wt % to about 5 wt %, less than, equal to, or greater than about 0.1 wt %, 0.2, 0.4, 0.6, 0.8, 1, 1.5, 2, 2.5, 3, 3.5, 4, 4.5, 5, 5.5, 6, 6.5, 7, 7.5, 8, 8.5, 9, 9.5, or about 10 wt %. Examples of suitable pigments include a pigment dispersion available under the trade designation SUNSPERSE BLUE 15, of Sun Chemical Corporation, Parsippany, New Jersey, USA; a pigment dispersion available under the trade designation SUNSPERSE VIOLET 23, of Sun Chemical Corporation, Parsippany, New Jersey, USA; a pigment dispersion available under the trade designation SUN BLACK, of Sun Chemical Corporation, Parsippany, New Jersey, USA; or a pigment dispersion available under the trade designation BLUE PIGMENT B2G, of Clariant Ltd., Charlotte, North Carolina, USA. The mixture of components can be polymerized by curing.

In addition to the materials already described, at least one magnetic material may be included within or coated to shaped abrasive particle 100 or 200. Examples of magnetic materials include iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite; zinc ferrite; nickel ferrite; cobalt ferrite, magnesium ferrite, barium ferrite, and strontium ferrite; yttrium iron garnet; and combinations of the foregoing. In some embodiments, the magnetizable material is an alloy containing 8 to 12 weight percent aluminum, 15 to 26 wt % nickel, 5 to 24 wt % cobalt, up to 6 wt % copper, up to 1% titanium, wherein the balance of material to add up to 100 wt % is iron. In some other embodiments, a magnetizable coating can be deposited on shaped abrasive particle 100 or 200 using a vapor deposition technique such as, for example, physical vapor deposition (PVD) including magnetron sputtering.

Including these magnetizable materials can allow shaped abrasive particle 100 or 200 to be responsive to a magnetic field. Any of shaped abrasive particles 100 or 200 can include the same material or include different materials.

Shaped abrasive particle 100 or 200 can be formed in many suitable manners; for example, shaped abrasive particle 100 or 200 can be made according to a multi-operation process. The process can be carried out using any material or precursor dispersion material. Briefly, for embodiments where shaped abrasive particles 100 or 200 are monolithic ceramic particles, the process can include the operations of making either a seeded or non-seeded precursor dispersion that can be converted into a corresponding ceramic (e.g., a boehmite sol-gel that can be converted to alpha alumina); filling one or more mold cavities having the desired outer shape of shaped abrasive particle 100 with a precursor dispersion; drying the precursor dispersion to form precursor shaped abrasive particle; removing the precursor shaped abrasive particle 100 or 200 from the mold cavities; calcining the precursor shaped abrasive particle 100 or 200 to form calcined, precursor shaped abrasive particle 100 or 200; and then sintering the calcined, precursor shaped abrasive particle 100 or 200 to form shaped abrasive particle 100 or 200. The process will now be described in greater detail in the context of alpha-alumina-containing shaped abrasive particle 100 or 200. In other embodiments, the mold cavities may be filled with a melamine to form melamine shaped abrasive particles.

The process can include the operation of providing either a seeded or non-seeded dispersion of a precursor that can be converted into ceramic. In examples where the precursor is seeded, the precursor can be seeded with an oxide of an iron (e.g., FeO). The precursor dispersion can include a liquid that is a volatile component. In one example, the volatile component is water. The dispersion can include a sufficient amount of liquid for the viscosity of the dispersion to be sufficiently low to allow filling mold cavities and replicating the mold surfaces, but not so much liquid as to cause subsequent removal of the liquid from the mold cavity to be prohibitively expensive. In one example, the precursor dispersion includes from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight, of the volatile component such as water. Conversely, the precursor dispersion in some embodiments contains from 30 percent to 50 percent, or 40 percent to 50 percent solids by weight.

Examples of suitable precursor dispersions include zirconium oxide sols, vanadium oxide sols, cerium oxide sols, aluminum oxide sols, and combinations thereof. Suitable aluminum oxide dispersions include, for example, boehmite dispersions and other aluminum oxide hydrates dispersions. Bochmite can be prepared by known techniques or can be obtained commercially. Examples of commercially available boehmite include products having the trade designations "DISPERAL" and "DISPAL", both available from Sasol North America, Inc., or "HIQ-40" available from BASF Corporation. These aluminum oxide monohydrates are relatively pure; that is, they include relatively little, if any, hydrate phases other than monohydrates, and have a high surface area.

The physical properties of the resulting shaped abrasive particle 100 or 200 can generally depend upon the type of material used in the precursor dispersion. As used herein, a "gel" is a three-dimensional network of solids dispersed in a liquid.

The precursor dispersion can contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, such as water-soluble salts. They can include a metal-containing compound and can be a precursor of an oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the precursor dispersion can be varied.

The introduction of a modifying additive or precursor of a modifying additive can cause the precursor dispersion to gel. The precursor dispersion can also be induced to gel by application of heat over a period of time to reduce the liquid content in the dispersion through evaporation. The precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina.

A peptizing agent can be added to the precursor dispersion to produce a more stable hydrosol or colloidal precursor dispersion. Suitable peptizing agents are monoprotic acids or acid compounds such as acetic acid, hydrochloric acid, formic acid, and nitric acid. Multiprotic acids can also be used, but they can rapidly gel the precursor dispersion, making it difficult to handle or to introduce additional components. Some commercial sources of boehmite contain an acid titer (such as absorbed formic or nitric acid) that will assist in forming a stable precursor dispersion.

The precursor dispersion can be formed by any suitable means; for example, in the case of a sol-gel alumina precursor, it can be formed by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

A further operation can include providing a mold having at least one mold cavity, or a plurality of cavities formed in at least one major surface of the mold. In some examples, the mold is formed as a production tool, which can be, for example, a belt, a sheet, a continuous web, a coating roll such as a rotogravure roll, a sleeve mounted on a coating roll, or a die. In one example, the production tool can include polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one example, the entire tooling is made from a polymeric or thermoplastic material. In another example, the surfaces of the tooling in contact with the precursor dispersion while the precursor dispersion is drying, such as the surfaces of the plurality of cavities, include polymeric or thermoplastic materials, and other portions of the tooling can be made from other materials. A suitable polymeric coating can be applied to a metal tooling to change its surface tension properties, by way of example.

A polymeric or thermoplastic production tool can be replicated off a metal master tool. The master tool can have the inverse pattern of that desired for the production tool. The master tool can be made in the same manner as the production tool. In one example, the master tool is made out of metal (e.g., nickel) and is diamond-turned. In one example, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that can distort the thermoplastic production tool, limiting its life.

Access to cavities can be from an opening in the top surface or bottom surface of the mold. In some examples, the cavities can extend for the entire thickness of the mold. Alternatively, the cavities can extend only for a portion of the thickness of the mold. In one example, the top surface is substantially parallel to the bottom surface of the mold with the cavities having a substantially uniform depth. At least one side of the mold, the side in which the cavities are formed, can remain exposed to the surrounding atmosphere during the step in which the volatile component is removed.

The cavities have a specified three-dimensional shape to make shaped abrasive particle 100 or 200. The depth dimension is equal to the perpendicular distance from the top surface to the lowermost point on the bottom surface. The depth of a given cavity can be uniform or can vary along its length and/or width. The cavities of a given mold can be of the same shape or of different shapes. To form serrations 112, one or more cavities can include one or more protrusions that imprint a serration in the precursor and resulting shaped abrasive particle.

In some embodiments, serrations 112 can be formed without including protrusions in the cavities. Instead, serrations 112 can be formed by etching serration 112 in a formed shaped abrasive particle 100 or 200. Serration 112 can be chemically etched using an etchant. To prevent certain portions of abrasive particle 100 or 200 from being etched, a mask can be deployed over shaped abrasive particle 100 or 200 to limit exposure of the etchant. Alternatively, serrations 112 can be etched using a laser (e.g., laser blading) or through electrical discharge machining. These steps are executed after shaped abrasive particle 100 or 200 is dried as a post-processing step.

A further operation involves filling the cavities in the mold with the precursor dispersion (e.g., by a conventional technique). In some examples, a knife roll coater or vacuum slot die coater can be used. A mold release agent can be used to aid in removing the particles from the mold if desired. Examples of mold release agents include oils such as peanut oil or mineral oil, fish oil, silicones, polytetrafluoroethylene, zinc stearate, and graphite. In general, a mold release agent such as peanut oil, in a liquid, such as water or alcohol, is applied to the surfaces of the production tooling in contact with the precursor dispersion such that from about 0.1 mg/in$^2$ (0.6 mg/cm$^2$) to about 3.0 mg/in$^2$ (20 mg/cm$^2$), or from about 0.1 mg/in$^2$ (0.6 mg/cm$^2$) to about 5.0 mg/in$^2$ (30 mg/cm$^2$), of the mold release agent is present per unit area of the mold when a mold release is desired. In some embodiments, the top surface of the mold is coated with the precursor dispersion. The precursor dispersion can be pumped onto the top surface.

In a further operation, a scraper or leveler bar can be used to force the precursor dispersion fully into the cavity of the mold. The remaining portion of the precursor dispersion that does not enter the cavity can be removed from the top surface of the mold and recycled. In some examples, a small portion of the precursor dispersion can remain on the top surface, and in other examples the top surface is substantially free of the dispersion. The pressure applied by the scraper or leveler bar can be less than 100 psi (0.6 MPa), or less than 50 psi (0.3 MPa), or even less than 10 psi (60 kPa). In some examples, no exposed surface of the precursor dispersion extends substantially beyond the top surface.

In those examples where it is desired to have the exposed surfaces of the cavities result in planar faces of the shaped abrasive particles, it can be desirable to overfill the cavities (e.g., using a micronozzle array) and slowly dry the precursor dispersion.

A further operation involves removing the volatile component to dry the dispersion. The volatile component can be removed by fast evaporation rates. In some examples, removal of the volatile component by evaporation occurs at temperatures above the boiling point of the volatile component. An upper limit to the drying temperature often depends on the material the mold is made from. For polypropylene tooling, the temperature should be less than the melting point of the plastic. In one example, for a water dispersion of from about 40 to 50 percent solids and a polypropylene mold, the drying temperatures can be from about 90° C. to about 165° C., or from about 105° C. to about 150° C., or from about 105° C. to about 120° C. Higher temperatures can lead to improved production speeds but can also lead to degradation of the polypropylene tooling, limiting its useful life as a mold.

During drying, the precursor dispersion shrinks, often causing retraction from the cavity walls. For example, if the cavities have planar walls, then the resulting shaped abrasive particle 100 can tend to have at least three concave major sides. It is presently discovered that by making the cavity walls concave (whereby the cavity volume is increased) it is possible to obtain shaped abrasive particle 100 that has at least three substantially planar major sides. The degree of concavity generally depends on the solids content of the precursor dispersion.

A further operation involves removing resultant precursor shaped abrasive particle 100 or 200 from the mold cavities. The precursor shaped abrasive particle 100 or 200 can be removed from the cavities by using the following processes alone or in combination on the mold: gravity, vibration, ultrasonic vibration, vacuum, or pressurized air to remove the particles from the mold cavities.

The precursor shaped abrasive particle 100 or 200 can be further dried outside of the mold. If the precursor dispersion is dried to the desired level in the mold, this additional drying step is not necessary. However, in some instances it can be economical to employ this additional drying step to minimize the time that the precursor dispersion resides in the mold. The precursor shaped abrasive particle 100 or 200 will be dried from 10 to 480 minutes, or from 120 to 400 minutes, at a temperature from 50° C. to 160° C., or 120° C. to 150° C.

A further operation involves calcining the precursor shaped abrasive particle 100 or 200. During calcining, essentially all the volatile material is removed, and the various components that were present in the precursor dispersion are transformed into metal oxides. The precursor shaped abrasive particle 100 or 200 is generally heated to a temperature from 400° C. to 800° C. and maintained within this temperature range until the free water and over 90 percent by weight of any bound volatile material are removed. In an optional step, it can be desirable to introduce the modifying additive by an impregnation process. A water-soluble salt can be introduced by impregnation into the pores of the calcined, precursor shaped abrasive particle 100. Then the precursor shaped abrasive particle 100 is pre-fired again.

A further operation can involve sintering the calcined, precursor shaped abrasive particle 100 or 200 to form particles 100 or 200. In some examples where the precursor includes rare earth metals, however, sintering may not be necessary. Prior to sintering, the calcined, precursor shaped abrasive particle 100 or 200 is not completely densified and thus lacks the desired hardness to be used as shaped abrasive particle 100 or 200. Sintering takes place by heating the calcined, precursor shaped abrasive particle 100 or 200 to a temperature of from 1000° C. to 1650° C. The length of time for which the calcined, precursor shaped abrasive particle 100 or 200 can be exposed to the sintering temperature to achieve this level of conversion depends upon various factors, but from five seconds to 48 hours is possible.

In another embodiment, the duration of the sintering step ranges from one minute to 90 minutes. After sintering, the shaped abrasive particle 100 or 200 can have a Vickers hardness of 10 GPa (gigaPascals), 16 GPa, 18 GPa, 20 GPa, or greater.

Additional operations can be used to modify the described process, such as, for example, rapidly heating the material from the calcining temperature to the sintering temperature, and centrifuging the precursor dispersion to remove sludge and/or waste. Moreover, the process can be modified by combining two or more of the process steps if desired. In further embodiments, shaped abrasive particles 100 or 200 can be formed through additive manufacturing.

Figure 3A:
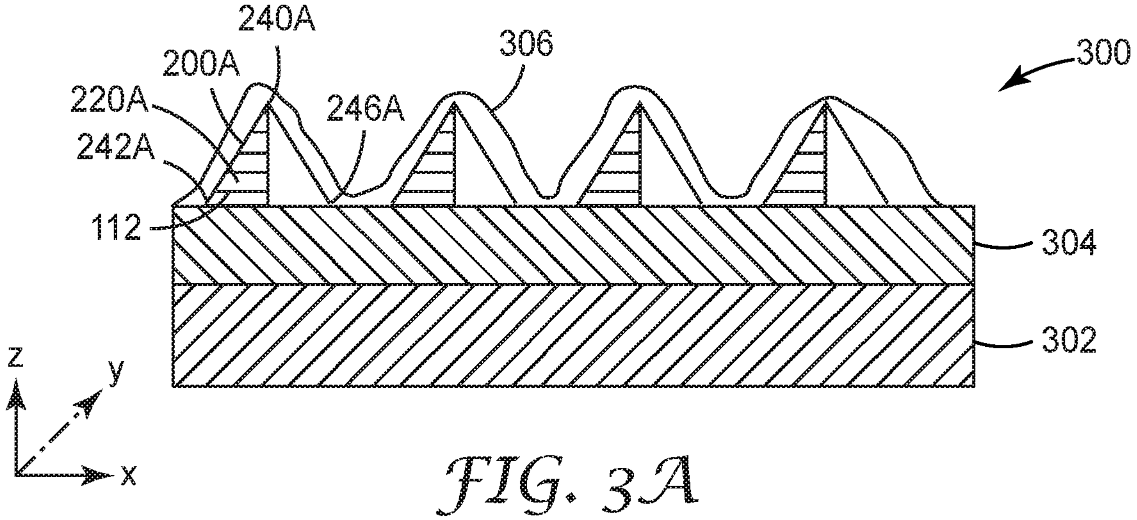
FIGS. 3A and 3B are sectional views of coated abrasive articles, in accordance with various embodiments.

Shaped abrasive particles 100 or 200 can be included in abrasive articles such as a coated abrasive article or a bonded abrasive article. FIG. 3A is a sectional view of coated abrasive article 300. Coated abrasive article 300 includes backing 302 defining a surface along an x-y direction. Backing 302 has a first layer of binder, hereinafter referred to as make coat 304, applied over a first surface of backing 302. Attached or partially embedded in make coat 304 are a plurality of shaped abrasive particles 200A. Although shaped abrasive particles 200A are shown, any other shaped abrasive particle described herein can be included in coated abrasive article 300. An optional second layer of binder, hereinafter referred to as size coat 306, is dispersed over shaped abrasive particles 200A. As shown, a major portion of shaped abrasive particles 200A have at least one of three vertices (242, 244, and 246) oriented in substantially the same direction. Thus, shaped abrasive particles 200A are oriented according to a non-random distribution, although in other embodiments any of shaped abrasive particles 200A can be randomly oriented on backing 302. In some embodiments, control of a particle's orientation can increase the cut of the abrasive article.

Backing 302 can be flexible or rigid. Examples of suitable materials for forming a flexible backing include a polymeric film, a metal foil, a woven fabric, a knitted fabric, paper, vulcanized fiber, a staple fiber, a continuous fiber, a nonwoven, a foam, a screen, a laminate, and combinations thereof. Backing 302 can be shaped to allow coated abrasive article 300 to be in the form of sheets, discs, belts, pads, or rolls. In some embodiments, backing 302 can be sufficiently flexible to allow coated abrasive article 300 to be formed into a loop to make an abrasive belt that can be run on suitable grinding equipment.

Make coat 304 secures shaped abrasive particles 200A to backing 302, and size coat 306 can help to reinforce shaped abrasive particles 200A. Make coat 304 and/or size coat 306 can include a resinous adhesive. The resinous adhesive can include one or more resins chosen from a phenolic resin, an epoxy resin, a urea-formaldehyde resin, an acrylate resin, an aminoplast resin, a melamine resin, an acrylated epoxy resin, a urethane resin, a polyester resin, a dying oil, and mixtures thereof.

Figure 3B:
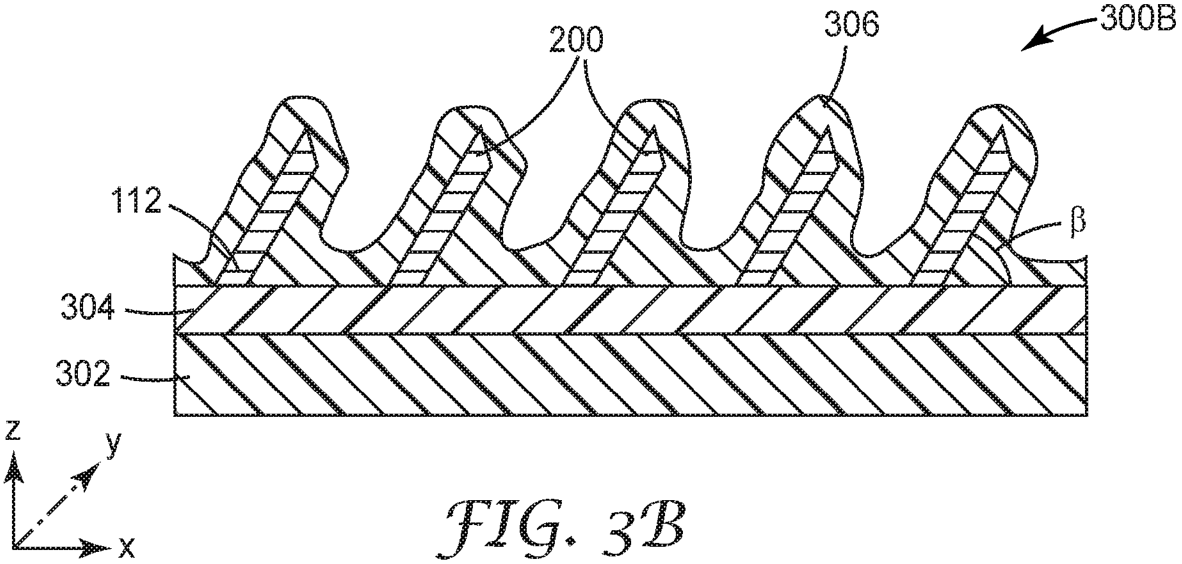

FIG. 3B shows an example of coated abrasive article 300B, which includes shaped abrasive particles 100 instead of shaped abrasive particles 200. As shown, shaped abrasive particles 100 are attached to backing 302 by make coat 304 with size coat 306 applied to further attach or adhere shaped abrasive particles 100 to backing 302. As shown in FIG. 3B, the majority of the shaped abrasive particles 100 are tipped or leaning to one side. This results in the majority of shaped abrasive particles 200 having an orientation angle β less than 90 degrees relative to backing 302.

Although shown as part of a coated abrasive article, shaped abrasive particles 100 or 200 can be incorporated into many different articles such as a bonded abrasive article or a fibrous abrasive article.

As shown in FIGS. 3A and 3B, each of the plurality of shaped abrasive particles 100 or 200 can have a specified z-direction rotational orientation about a z-axis passing through shaped abrasive particles 100 or 200 and through backing 302 at a 90 degree angle to backing 302. Shaped abrasive particles 100 or 200 are orientated with a surface feature, such as a serrations 112, rotated into a specified angular position about the z-axis. The specified z-direction rotational orientation of abrasive article 300 or 300B occurs more frequently than would occur by a random z-directional rotational orientation of the surface feature due to electrostatic coating or drop coating of the shaped abrasive particles 100 or 200 when forming the abrasive article 300 or 300B. As such, by controlling the z-direction rotational orientation of a significantly large number of shaped abrasive particles 100 or 200, the cut rate, finish, or both of coated abrasive article 300 or 300B can be varied from those manufactured using an electrostatic coating method. In various embodiments, at least 50, 51, 55, 60, 65, 70, 75, 80, 85, 90, 95, or 99 percent of shaped abrasive particles 100 or 200 can have a specified z-direction rotational orientation which does not occur randomly and which can be substantially the same for all of the aligned particles. In other embodiments, about 50 percent of shaped abrasive particles 100 or 200 can be aligned in a first direction and about 50 percent of shaped abrasive particles 100 or 200 can be aligned in a second direction. In one embodiment, the first direction is substantially orthogonal to the second direction.

The specific z-direction rotational orientation of formed abrasive particles can be achieved through use of a precision apertured screen or tool that positions shaped abrasive particles 100 or 200 into a specific z-direction rotational orientation such that shaped abrasive particle 100 or 200 can only fit into the precision apertured screen in a few specific orientations such as less than or equal to 4, 3, 2, or 1 orientations. For example, a rectangular opening just slightly bigger than the cross-section of shaped abrasive particle 100 or 200 comprising a rectangular plate will orient shaped abrasive particle 100 or 200 in one of two possible 180 degree opposed z-direction rotational orientations. The precision apertured screen can be designed such that shaped abrasive particles 100 or 200, while positioned in the screen's apertures, can rotate about their z-axis (normal to the screen's surface when the formed abrasive particles are positioned in the aperture) less than or equal to about 30, 20, 10, 5, 2, or 1 angular degrees.

The precision apertured screen having a plurality of apertures selected to z-directionally orient shaped abrasive particles 100 and 200 into a pattern can have a retaining member such as adhesive tape on a second precision apertured screen with a matching aperture pattern, an electrostatic field used to hold the particles in the first precision screen, or a mechanical lock such as two precision apertured screens with matching aperture patterns twisted in opposite directions to pinch particles 100 and 200 within the apertures. The first precision aperture screen is filled with shaped abrasive particles 100 and 200, and the retaining member is used to hold shaped abrasive particles 100 in place in the apertures. In one embodiment, adhesive tape on the surface of a second precision aperture screen aligned in a stack with the first precision aperture screen causes shaped abrasive particles 100 to stay in the apertures of the first precision screen stuck to the surface of the tape exposed in the second precision aperture screen's apertures.

Following positioning in apertures, coated backing 302 having make coat 304 is positioned parallel to the first precision aperture screen surface containing the shaped abrasive particles 100 or 200, with make coat 304 facing shaped abrasive particles 100 or 200 in the apertures. Thereafter, coated backing 302 and the first precision aperture screen are brought into contact to adhere shaped abrasive particles 100 or 200 to the make coat 304 layer. The retaining member is released such as removing the second precision aperture screen with taped surface, untwisting the two precision aperture screens, or eliminating the electrostatic field. Then the first precision aperture screen is removed, leaving the shaped abrasive particles 100 or 200 having a specified z-directional rotational orientation on the coated abrasive article 300 for further conventional processing such as applying a size coat and curing the make and size coats. The orientation can further be controlled using magnets to rotated and orient shaped abrasive particles 100 or 200, providing that they are response to a magnetic field.

Abrasive article 300 or any other abrasive article can also include conventional (e.g., crushed) abrasive particles. Examples of useful crushed abrasive particles include fused aluminum oxide-based materials such as aluminum oxide, ceramic aluminum oxide (which can include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and mixtures thereof.

The conventional abrasive particles can, for example, have an average diameter ranging from about 10 μm to about 2000 μm, about 20 μm to about 1300 μm, about 50 μm to about 1000 μm, less than, equal to, or greater than about 10 μm, 20, 30, 40, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1650, 1700, 1750, 1800, 1850, 1900, 1950, or 2000 μm. For example, the conventional abrasive particles can have an abrasives industry-specified nominal grade. Such abrasives industry-accepted grading standards include those known as the American National Standards Institute, Inc. (ANSI) standards, Federation of European Producers of Abrasive Products (FEPA) standards, and Japanese Industrial Standard (HS) standards. Exemplary ANSI grade designations (e.g., specified nominal grades) include: ANSI 12 (1842 μm), ANSI 16 (1320 μm), ANSI 20 (905 μm), ANSI 24 (728 μm), ANSI 36 (530 μm), ANSI 40 (420 μm), ANSI 50 (351 μm), ANSI 60 (264 μm), ANSI 80 (195 μm), ANSI 100 (141 μm), ANSI 120 (116 μm), ANSI 150 (93 μm), ANSI 180 (78 μm), ANSI 220 (66 μm), ANSI 240 (53 μm), ANSI 280 (44 μm), ANSI 320 (46 μm), ANSI 360 (30 μm), ANSI 400 (24 μm), and ANSI 600 (16 μm). Exemplary FEPA grade designations include P12 (1746 μm), P16 (1320 μm), P20 (984 μm), P24 (728 μm), P30 (630 μm), P36 (530 μm), P40 (420 μm), P50 (326 μm), P60 (264 μm), P80 (195 μm), P100 (156 μm), P120 (127 μm), P120 (127 μm), P150 (97 μm), P180 (78 μm), P220 (66 μm), P240 (60 μm), P280 (53 μm), P320 (46 μm), P360 (41 μm), P400 (36 μm), P500 (30 μm), P600 (26 μm), and P800 (22 μm). An approximate average particles size of reach grade is listed in parenthesis following each grade designation.

Filler particles can also be included in abrasive articles 300 or 400. Examples of useful fillers include metal carbonates (such as calcium carbonate, calcium magnesium carbonate, sodium carbonate, magnesium carbonate), silica (such as quartz, glass beads, glass bubbles and glass fibers), silicates (such as talc, clays, montmorillonite, feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, sugar, wood flour, a hydrated aluminum compound, carbon black, metal oxides (such as calcium oxide, aluminum oxide, tin oxide, titanium dioxide), metal sulfites (such as calcium sulfite), thermoplastic particles (such as polycarbonate, polyetherimide, polyester, polyethylene, poly(vinylchloride), polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles and the like). The filler may also be a salt such as a halide salt. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metal fillers include, tin, lead, bismuth, cobalt, antimony, cadmium, iron and titanium. Other miscellaneous fillers include sulfur, organic sulfur compounds, graphite, lithium stearate and metallic sulfides. In some embodiments, individual shaped abrasive particles 100 or 200 or individual crushed abrasive particles can be at least partially coated with an amorphous, ceramic, or organic coating. Examples of suitable components of the coatings include a silane, glass, iron oxide, aluminum oxide, or combinations thereof. Coatings such as these can aid in processing and bonding of the particles to a resin of a binder.

EXAMPLES

Various embodiments of the present disclosure can be better understood by reference to the following Examples which are offered by way of illustration. The present disclosure is not limited to the Examples given herein.

TABLE 1

| ABBREVIATION | DESCRIPTION |
|---|---|
| AP1 and AP2 | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles were about 3 mm (side length) × 0.75 mm (thickness), with a draft angle approximately 98 degrees. |
| LB1 | A laser beam was produced using the IPG Photonics, model YLR-150/1500-QCW-AC-Y14, 1064 nm fiber laser operated in pulse mode (pulse width 0.05 milliseconds) at 17% power (about 245 W). |

Figure 4A:
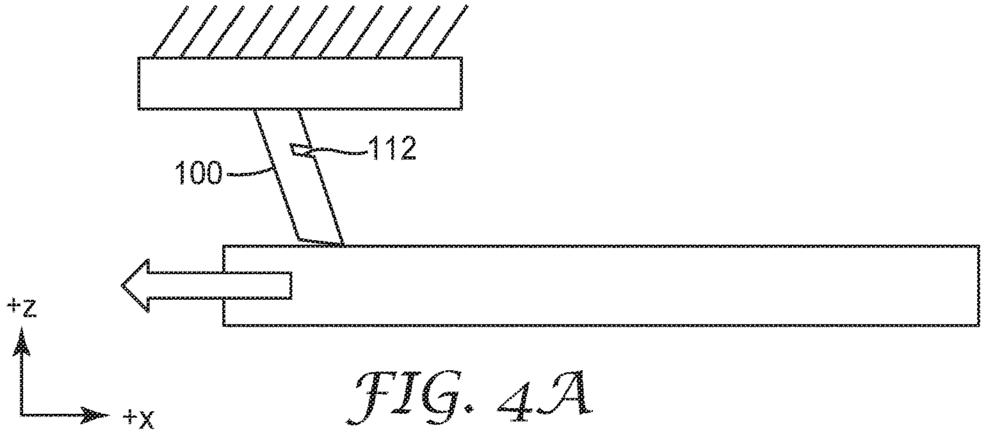
FIGS. 4A-4D are diagrams and pictures from an experiment in which the claims of this article are evaluated, showing the fracture of an abrasive particle at a serration as a result of forces from cutting action.

In this example, a relatively smooth, flat, plate of steel AISI 1018, described as the workpiece, was brought into contact with a single shaped abrasive particle AP1 (e.g., shaped abrasive particle 100) with one serration 112 located about 75% up along sidewall 106B. Serration 112 was semicircular in cross section, about 70 μm wide, and extended approximately 25 μm into the particle. It was imparted by ablating the surface of the particle AP1 with a laser beam LB1. The single shaped abrasive particle was secured on a stainless-steel plate with epoxy resin DP460 (available from 3M Company, St. Paul, MN). The stainless-steel plate was secured to a larger, stationary frame with screws. While the single shaped abrasive particle was held stationary, the workpiece was translated in space in the negative x-direction (as shown in FIG. 4A) via a linear actuator (Zaber Technologies Inc., Vancouver, British Columbia, Canada, model No: A-LST0250B-E01C) using displacement control at a speed of 5 mm/second. FIG. 4A depicts this procedure.

Figure 4B:
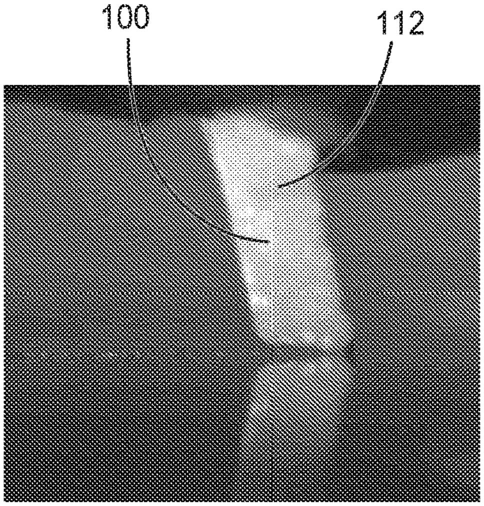
Figure 4C:
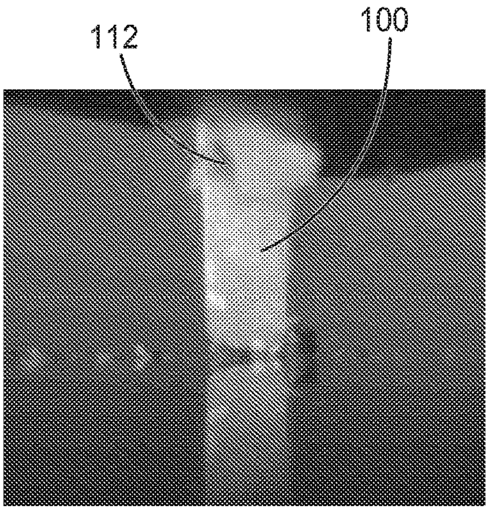
Figure 4D:
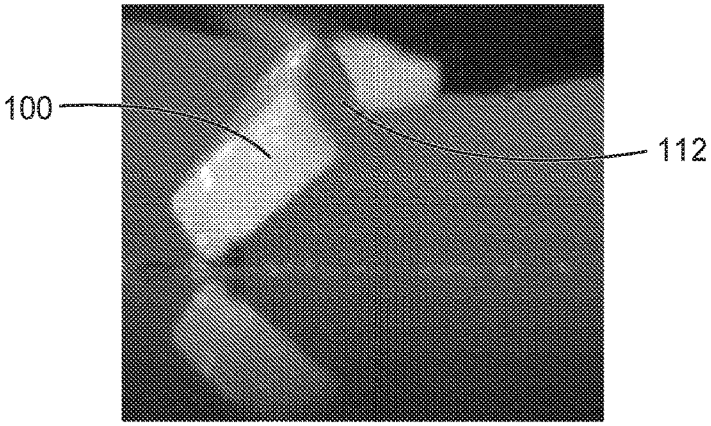

Contact between the shaped abrasive particle and the steel 1018 workpiece was observed using a camera (Vision Research, model: Phantom VEO 640S Digital High-Speed Camera, Wayne NJ) recording at 300 frames/second. FIGS. 4B through 4D show, from left to right, temporally progressive images (captured by the camera) surrounding a fracture event in which the fracture was initiated at serration 112, about 80% up (towards the upper edge of the images) the shaped abrasive grain. FIG. 4B shows the abrasive grain cutting and displacing material from the steel 1018 workpiece. The serration 112 can be observed 80% up the height of the shaped abrasive grain. FIG. 4C shows the particle fractured at the serration 112, and it also shows the fractured piece of the particle detaching from what remains of the particle. FIG. 4D shows the fractured piece of the particle further detached as well as a new, exposed cutting tip still secured by the epoxy resin.

Figure 5A:
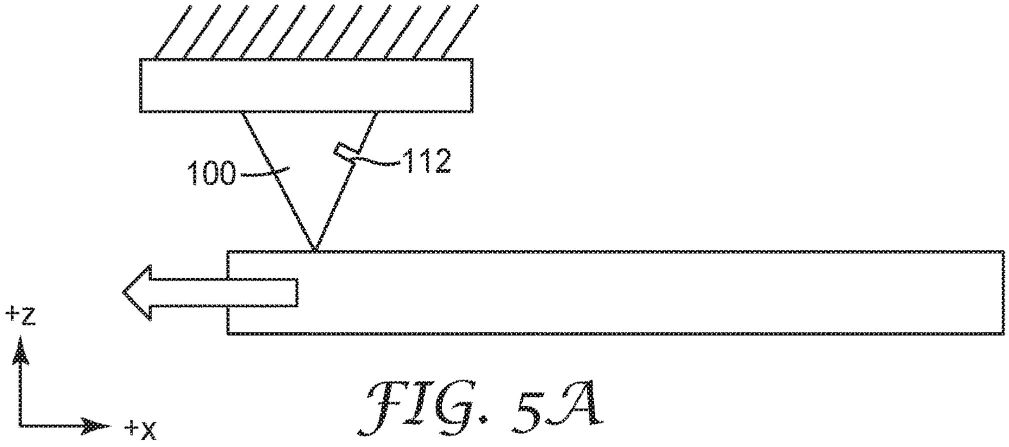
FIGS. 5A-5D are diagrams and pictures from another experiment in which the claims of this article are evaluated, showing the fracture of another abrasive particle at a serration as a result of forces from cutting action.

In another example, the workpiece, was brought into contact with a single shaped abrasive particle AP2 (e.g., shaped abrasive particle 100) with one serration 112. Serration 112 was located 50% up along sidewall 106B with an approximate length of 110 μm and a semicircular closed end 116 with an approximate diameter of 70 μm. Serration 112 extended approximately 25% across face 106B. It was imparted by ablating the surface of the particle AP1 with a laser beam LB1. The single shaped abrasive particle was secured on a stainless-steel plate with epoxy resin DP460 (available from 3M Company, St. Paul, MN). The stainless-steel plate was secured to a larger, stationary frame with screws. While the single shaped abrasive particle was held stationary, the workpiece was translated in space in the negative x-direction (as shown in FIG. 5A) via a linear actuator (Zaber Technologies Inc., Vancouver, British Columbia, Canada, model No: A-LST0250B-E01C) using displacement control at a speed of 5 mm/second. FIG. 5A depicts this procedure.

Figure 5B:
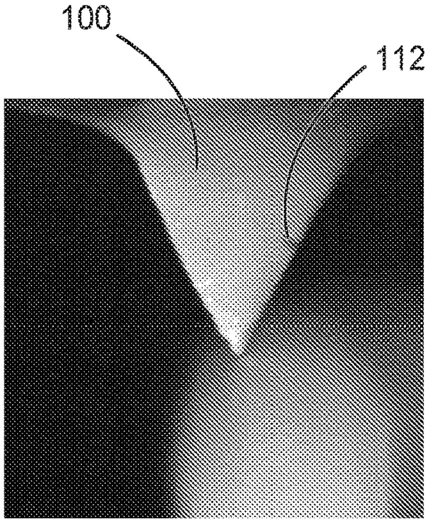
Figure 5C:
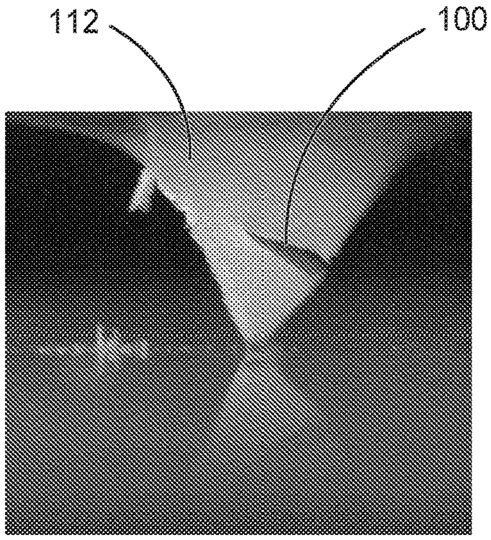
Figure 5D:
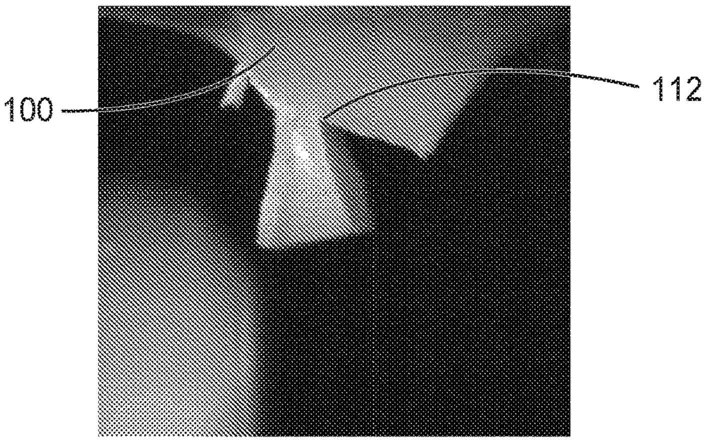

Contact between the shaped abrasive particle and the steel 1018 workpiece was observed using a camera (Vision Research, model: Phantom VEO 640S Digital High-Speed Camera, Wayne NJ) recording at 300 frames/second. FIGS. 5B through 5D show, from left to right, temporally progressive images (captured by the camera) surrounding a fracture event in which the fracture was initiated at serration 112, about 50% up (towards the upper edge of the images) the shaped abrasive grain. FIG. 5B shows the abrasive grain immediately before contact between the grain and the workpiece began. The serration 112 can be observed 50% up the height of the shaped abrasive grain. FIG. 5C shows the particle fractured at the serration 112, and it also shows the fractured piece of the particle detaching from what remains of the particle. FIG. 5D shows the fractured piece of the particle further detached as well as a new, exposed cutting tip still secured by the epoxy resin.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

ADDITIONAL EMBODIMENTS

The following exemplary embodiments are provided, the numbering of which is not to be construed as designating levels of importance:

Embodiment 1 provides a shaped abrasive particle comprising:

- a plurality of polygonal faces bound by respective polygonal perimeters and joined by at least one edge or sidewall to form the shaped abrasive particle; and
- a serration configured to generate a fracture along a fracture plane extending at least through the serration.

Embodiment 2 provides the shaped abrasive particle of Embodiment 1, wherein the shaped abrasive particle is a tetrahedral shaped abrasive particle comprising four triangular faces joined by six edges terminating at four vertices.

Embodiment 3 provides the shaped abrasive particle of Embodiment 2, wherein at least one of the four vertices is substantially planar and comprises a triangular perimeter.

Embodiment 4 provides the shaped abrasive particle of Embodiment 1, wherein the shaped abrasive particle is a truncated pyramid shaped abrasive particle comprising two triangular faces joined by three sidewalls.

Embodiment 5 provides the shaped abrasive particle of Embodiment 4, wherein the sidewall is a sloping sidewall and a dihedral angle between a triangular face and the sidewall is in a range of from about 10 degrees to about 80 degrees.

Embodiment 6 provides the shaped abrasive particle of any one of Embodiments 4 or 5, wherein the sidewall is a sloping sidewall and a dihedral angle between a triangular face and the sidewall is in a range of from about 70 degrees to about 90 degrees.

Embodiment 7 provides the shaped abrasive particle of any one of Embodiments 1-6, wherein the serration extends from an open end defined by an external surface of the at least one face, the edge, or the sidewall to a closed end.

Embodiment 8 provides the shaped abrasive particle of Embodiment 7, wherein a distance between the open end and the closed end is in a range of from about 0.5 percent depth of the abrasive particle to about 20 percent depth of the abrasive particle.

Embodiment 9 provides the shaped abrasive particle of any one of Embodiments 7 or 8, wherein the distance between the open end and the closed end is in a range of from about 2 percent depth of the abrasive particle to about 10 percent depth of the abrasive particle.

Embodiment 10 provides the shaped abrasive particle of any one of Embodiments 7-9, wherein a cross sectional geometry of the serration substantially conforms to a circular or polygonal shape.

Embodiment 11 provides the shaped abrasive particle of Embodiment 10, wherein the circular shape comprises a symmetric shape.

Embodiment 12 provides the shaped abrasive particle of any one of Embodiments 10 or 11, wherein the circular shape comprises a cylindrical shape, a conical shape, or a frustoconical shape.

Embodiment 13 provides the shaped abrasive particle of Embodiment 10, wherein the polygonal shape comprises a symmetric or asymmetric triangular shape, a quadrilateral shape, a pentagonal shape, or a hexagonal shape.

Embodiment 14 provides the shaped abrasive particle of Embodiment 13, wherein the symmetric or asymmetric triangular shape comprises an equilateral triangle, a right triangle, a scalene triangle, an isosceles triangle, an acute triangle, or an obtuse triangle.

Embodiment 15 provides the shaped abrasive particle of Embodiment 13, wherein the symmetric or asymmetric quadrilateral shape comprises a square, a rectangle, a rhombus, or a trapezoid.

Embodiment 16 provides the shaped abrasive particle of any one of Embodiments 1-15, wherein the closed end comprises a curved surface, a square surface, a trapezoidal surface, or a v-shaped surface.

Embodiment 17 provides the shaped abrasive particle of Embodiment 16, wherein a radius of curvature of the curved surface is in a range of about 0.1 microns units to about 50 microns.

Embodiment 18 provides the shaped abrasive particle of any one of Embodiments 16 or 17, wherein a radius of curvature of the curved surface is in a range of about 0.5 microns to about 20 microns.

Embodiment 19 provides the shaped abrasive particle of any one of Embodiments 16-18, wherein the open end extends over a range of from about 0.0025 percent surface area to about 10 percent surface area of the at least one face, the edge, or the sidewall to a closed end.

Embodiment 20 provides the shaped abrasive particle of any one of Embodiments 16-19, wherein the open end extends over a range of from about 0.1 percent surface area to about 5 percent surface area of the at least one face, the edge, or the sidewall to a closed end.

Embodiment 21 provides the shaped abrasive particle of any one of Embodiments 1-20, wherein the serration extends in a direction substantially perpendicular to the external surface of the at least one face, the edge, or the sidewall to a closed end.

Embodiment 22 provides the shaped abrasive particle of any one of Embodiments 1-21, wherein the serration extends in a direction offset in a range of about 0 degrees to about 60 degrees from a direction substantially perpendicular to the external surface of the at least one face, the edge, or the sidewall to a closed end.

Embodiment 23 provides the shaped abrasive particle of any one of Embodiments 1-22, wherein the shaped abrasive particle is a ceramic shaped abrasive particle.

Embodiment 24 provides the shaped abrasive particle of any one of Embodiments 1-23, wherein the shaped abrasive particle comprises alpha alumina, sol-gel derived alpha alumina, or a mixture thereof.

Embodiment 25 provides the shaped abrasive particle of any one of Embodiments 1-24, wherein the shaped abrasive particles comprises a polymeric material, a fused aluminum oxide, a heat-treated aluminum oxide, a ceramic aluminum oxide, a sintered aluminum oxide, a silicon carbide material, a titanium diboride, a boron carbide, a tungsten carbide, a titanium carbide, a diamond, a cubic boron nitride, a garnet, a fused alumina-zirconia, a cerium oxide, a zirconium oxide, a titanium oxide or a combination thereof.

Embodiment 26 provides the shaped abrasive particle of any one of Embodiments 1-25, further comprising a plurality of the serrations.

Embodiment 27 provides the shaped abrasive particle of Embodiment 26, wherein a spacing between adjacent serrations is constant.

Embodiment 28 provides the shaped abrasive particle of any one of Embodiments 26 or 27, wherein the spacing between adjacent serrations is variable.

Embodiment 29 provides the shaped abrasive particle of any one of Embodiments 26-28, wherein a first portion of the plurality of serrations is distributed in a first region of the shaped abrasive particle.

Embodiment 30 provides the shaped abrasive particle of Embodiment 29, wherein the first portion of the plurality of serrations is in a range of about 5 percent to about 100 percent of the total number of serrations.

Embodiment 31 provides the shaped abrasive particle of any one of Embodiments 29 or 30, wherein the first the portion of the plurality of serrations is in a range of about 25 percent to about 33 percent of the total number of serrations.

Embodiment 32 provides the shaped abrasive particle of any one of Embodiments 29-31, wherein the first region is in a range of from about 5 percent to about 100 percent of the total surface area of the shaped abrasive particle.

Embodiment 33 provides the shaped abrasive particle of any one of Embodiments 29-32, wherein the first region is in a range of from about 25 percent to about 33 percent of the total surface area of the shaped abrasive particle.

Embodiment 34 provides the shaped abrasive particle of any one of Embodiments 29-33, further comprising a second portion of the plurality of serrations distributed in a second region of the shaped abrasive particle.

Embodiment 35 provides the shaped abrasive particle of Embodiment 34, wherein the second portion of the plurality of serrations is in a range of about 5 percent to about 100 percent of the total number of serrations.

Embodiment 36 provides the shaped abrasive particle of any one of

Embodiments 34 or 35, wherein the second of the plurality of serrations is in a range of about 25 percent to about 33 percent of the total number of serrations.

Embodiment 37 provides the shaped abrasive particle of any one of Embodiments 34-36, wherein the second region is in a range of from about 5 percent to about 100 percent of the total surface area of the shaped abrasive particle.

Embodiment 38 provides the shaped abrasive particle of any one of Embodiments 34-37, wherein the second region is in a range of from about 25 percent to about 33 percent of the total surface area of the shaped abrasive particle.

Embodiment 39 provides the shaped abrasive particle of any one of Embodiments 1-38, wherein at least one of the faces is planar.

Embodiment 40 provides the shaped abrasive particle of any one of Embodiments 1-39, wherein at least one of the faces is substantially non-planar.

Embodiment 41 provides the shaped abrasive particle of Embodiment 40, wherein at least one of the faces is convex.

Embodiment 42 provides the shaped abrasive particle of any one of Embodiments 40 or 41, wherein at least one of the faces is concave.

Embodiment 43 provides the shaped abrasive particle of any one of Embodiments 1-42, wherein the shaped abrasive particle comprises at least one shape feature comprising: an opening, a concave surface, a convex surface, a fractured surface, or a low roundness factor.

Embodiment 44 provides the shaped abrasive particle of any one of Embodiments 1-43, wherein at least one of the edges is tapered.

Embodiment 45 provides the shaped abrasive particle of any one of Embodiments 1-44, wherein the shaped abrasive particle is a monolithic shaped abrasive particle.

Embodiment 46 provides the shaped abrasive particle of any one of Embodiments 1-45, wherein the shaped abrasive particle is at least partially fractured.

Embodiment 47 provides a method of making the shaped abrasive particle of any one of Embodiments 1-46, the method comprising:

disposing an abrasive particle precursor composition in a mold cavity conforming to the negative image of the shaped abrasive particle; and drying the abrasive particle precursor to form the shaped abrasive particle.

Embodiment 48 provides the method of Embodiment 47, wherein the mold cavity comprises one or more protruding ridges to form a serration.

Embodiment 49 provides the method of Embodiment 48, wherein the one or more protruding ridges protrudes from a side of the mold cavity.

Embodiment 50 provides the method of Embodiment 47, further comprising exposing an external surface of the shaped abrasive particle to a laser to form the serration.

Embodiment 51 provides a method of making the shaped abrasive particle of any one of Embodiments 1-50, the method comprising etching the serration in the external surface of the shaped abrasive particle.

Embodiment 52 provides the method of Embodiment 51, wherein the external surface is etched using laser blading or electrical discharge machining.

Embodiment 53 provides a method of making the shaped abrasive particle of any one of Embodiments 1-49, the method comprising:

additively manufacturing the shaped abrasive particle.

Embodiment 54 provides a coated abrasive article comprising:

a backing; and a plurality of the shaped abrasive particle of any one of Embodiments 1-49 or manufactured according to the methods of any one of Embodiments 50-53, attached to the backing.

Embodiment 55 provides a bonded abrasive article comprising:

a binder; and a plurality of the shaped abrasive particle of any one of Embodiments 1-49 or manufactured according to the methods of any one of Embodiments 50-53 disposed in the binder.

Embodiment 56 provides the coated abrasive article or bonded abrasive article of any one of Embodiments 54 or 55, wherein the article comprises a blend of the shaped abrasive particles and crushed abrasive particles.

Embodiment 57 provides the coated abrasive article or bonded abrasive article of Embodiment 56, wherein the shaped abrasive particles and the crushed abrasive particles comprise the same material or mixture of materials.

Embodiment 58 provides the coated abrasive article or bonded abrasive article of any one of Embodiments 54-57, wherein the shaped abrasive particles are in a range of from about 5 wt % to about 99 wt % of the blend.

Embodiment 59 provides the coated abrasive article or bonded abrasive article of any one of Embodiments 54-58, wherein the abrasive article comprises a belt, a disc, or a sheet.

Embodiment 60 provides the coated abrasive article of any one of Embodiments 54 and 56-59, further comprising a make coat adhering the shaped abrasive particles to the backing.

Embodiment 61 provides the coated abrasive article of Embodiment 60, further comprising a size coat adhering the shaped abrasive particles to the make coat.

Embodiment 62 provides the coated abrasive article of any one of

Embodiments 60 or 61, wherein one or more serrations of at least one shaped abrasive particle are embedded in the make coat.

Embodiment 63 provides the coated abrasive article of any one of Embodiments 60-62, wherein at least one of the make coat and the size coat comprise a phenolic resin, an epoxy resin, a urea-formaldehyde resin, an acrylate resin, an aminoplast resin, a melamine resin, an acrylated epoxy resin, a urethane resin, or mixtures thereof.

Embodiment 64 provides the coated abrasive article of any one of Embodiments 60-63, wherein at least one of the make coat and the size coat comprises a filler, a grinding aid, a wetting agent, a surfactant, a dye, a pigment, a coupling agent, an adhesion promoter, or a mixture thereof.

Embodiment 65 provides the coated abrasive article of Embodiment 64, wherein the filler comprises calcium carbonate, silica, talc, clay, calcium metasilicate, dolomite, aluminum sulfate, or a mixture thereof.

Embodiment 66 provides the coated abrasive article or bonded abrasive article of any one of Embodiments 54-65, wherein the abrasive article comprises a disc, a belt, or a sheet and the z-direction rotational angle positions the shaped abrasive particles.

Embodiment 67 provides the coated abrasive article or bonded abrasive article of any one of Embodiments 54-66, wherein a height of at least two of the shaped abrasive particles is different.

Embodiment 68 provides the coated abrasive article or bonded abrasive article of any one of Embodiments 54-67, wherein at least one of the shaped abrasive particles is at least partially fractured.

Embodiment 69 provides a method of making the abrasive article of any one of Embodiments 54-68, the method comprising:

adhering the shaped abrasive particles to the backing or depositing the shaped abrasive particles in the binder.

Embodiment 70 provides the method of Embodiment 69, further comprising orienting at least one of the shaped abrasive particles.

Embodiment 71 provides the method of Embodiment 70, wherein orienting the shaped abrasive particles comprises passing the at least one of the shaped abrasive particles through a screen to result in the at least one shaped abrasive particle having a predetermined z-direction rotational orientation.

Embodiment 72 provides the method of Embodiment 70, wherein orienting the at least one shaped abrasive particle comprises placing the at least one shaped abrasive particle in an individual cavity of a transfer tool and contacting the at least one shaped abrasive particle with the backing to result in the at least one shaped abrasive particle having a predetermined z-direction rotational orientation.

Embodiment 73 provides the method of Embodiment 70, wherein orienting the at least one shaped abrasive particle comprises exposing at least one shaped abrasive particle to a magnetic field.

Embodiment 74 provides the method of Embodiment 73, further comprising rotating the at least one shaped abrasive particle in the magnetic field.

Embodiment 75 provides the method of any one of Embodiments 70-74, wherein adhering the shaped abrasive particles to the backing comprises contacting the shaped abrasive particles with a make coat disposed over at least a portion of the backing.

Embodiment 76 provides the method of Embodiment 75, wherein adhering the shaped abrasive particles to the backing further comprises disposing a size coat over at least a portion of the shaped abrasive particles and at least one of the make coat and the backing.

Embodiment 77 provides a method of using the abrasive article according to any one of Embodiments 54-68 or made according to the method of any one of Embodiments 69-76, the method comprising:

contacting the shaped abrasive particles with a workpiece;

moving at least one of the abrasive article and the workpiece relative to each other in the direction of use; and removing a portion of the workpiece.

Embodiment 78 provides the method of Embodiment 77, further comprising fracturing at least one of the shaped abrasive particles.

Embodiment 79 provides the method of Embodiment 78, wherein the at least one shaped abrasive particle is fractured at the serration.

What is claimed is:

1. A shaped abrasive particle comprising:

a plurality of polygonal faces bound by respective polygonal perimeters and joined by sidewalls to form the shaped abrasive particle, each of the sidewalls being planar and extending between two faces of the plurality of polygonal faces; and a plurality of serrations, adjacent serrations being spaced at constant intervals with respect to each other, each serration configured to generate a fracture along a fracture plane extending at least through the serration;

wherein the plurality of serrations are located on one of the sidewalls of the shaped abrasive particle and are arranged in select regions to control the location where fracture is initiated.

2. The shaped abrasive particle of claim 1, wherein the shaped abrasive particle is a truncated pyramid shaped abrasive particle comprising two triangular faces joined by three sidewalls.

3. The shaped abrasive particle of claim 1, wherein the serration extends from an open end defined by an external surface of one of sidewalls to a closed end.

4. The shaped abrasive particle of claim 3, wherein a distance between the open end and the closed end is in a range of from about 0.5 percent depth of the abrasive particle to about 20 percent depth of the abrasive particle.

5. The shaped abrasive particle of claim 4, wherein the open end extends over a range of from about 0.0025 percent surface area to about 10 percent surface area of one of the sidewalls to a closed end.

6. The shaped abrasive particle of claim 4, wherein the serration extends in a direction substantially perpendicular to the external surface of one of the sidewalls to a closed end along a linear path or a non-linear path.

7. The shaped abrasive particle of claim 4, wherein the closed end comprises a curved surface, a square surface, a trapezoidal surface, or a v-shaped surface.

8. The abrasive article of claim 1, wherein each serration extends from an open end defined by an outer surface of the sidewall to a closed end along a line extending in a direction substantially perpendicular to the sidewall, or extends in a direction offset from said line in a range of from 1 degree to 60 degrees.

9. The abrasive article of claim 8, wherein a fracture propagation direction substantially along the fracture plane is controlled in accordance with the degree to which individual serrations are aligned with or offset from the line so that selected portions of the shaped abrasive particle are removed in order.

10. A coated abrasive article comprising:

a backing; and a plurality of the shaped abrasive particle of claim 1, attached to the backing.

11. A method of making the abrasive article of claim 10, the method comprising:

adhering the shaped abrasive particles to the backing or depositing the shaped abrasive particles in the binder.

12. A method of making the shaped abrasive particle of claim 1, the method comprising:

disposing an abrasive particle precursor composition in a mold cavity conforming to the negative image of the shaped abrasive particle; and drying the abrasive particle precursor to form the shaped abrasive particle.

13. The method of claim 12, further comprising exposing an external surface of the shaped abrasive particle to a laser to form the serration.

14. A bonded abrasive article comprising:

a binder; and a plurality of the shaped abrasive particle manufactured according to the method of claim 12 disposed in the binder.

15. The bonded abrasive article of claim 14, wherein the article comprises a blend of the shaped abrasive particles and crushed abrasive particles.

* * * * *